US012614213B1

(12) United States Patent
Miller et al.

(10) Patent No.: US 12,614,213 B1
(45) Date of Patent: Apr. 28, 2026

(54) DIGITAL CONTENT GENERATION AND REFINEMENT PLATFORM

(71) Applicant: 1CH, LLC, Fort Worth, TX (US)

(72) Inventors: Rachel Alexandria Miller, Fort Worth, TX (US); Holly Renee Homer, Flower Mound, TX (US)

( * ) Notice: Subject to any disclaimer, the term of this patent is extended or adjusted under 35 U.S.C. 154(b) by 0 days.

(21) Appl. No.: 18/386,369

(22) Filed: Nov. 2, 2023

(51) Int. Cl.
*G06Q 30/0241* (2023.01)
*G06F 16/958* (2019.01)
*G06F 40/186* (2020.01)

(52) U.S. Cl.
CPC ....... *G06Q 30/0276* (2013.01); *G06F 16/972* (2019.01); *G06F 40/186* (2020.01)

(58) Field of Classification Search
CPC ................................................ G06Q 30/0276
See application file for complete search history.

(56) References Cited

U.S. PATENT DOCUMENTS

| | | | | |
|---|---|---|---|---|
| 6,085,201 | A * | 7/2000 | Tso | G06F 40/284 |
| | | | | 715/205 |
| 8,990,672 | B1 | 3/2015 | Grosz et al. | |
| 9,519,624 | B1 * | 12/2016 | Genoni | G06F 3/04845 |
| 10,073,923 | B2 | 9/2018 | Koren et al. | |
| 10,733,370 | B2 | 8/2020 | Owens et al. | |
| 11,151,313 | B2 | 10/2021 | Chua et al. | |
| 11,392,643 | B2 * | 7/2022 | Guillen | G06F 40/205 |
| 11,423,207 | B1 | 8/2022 | Li | |
| 11,468,143 | B2 | 10/2022 | Saar et al. | |
| 11,520,973 | B2 | 12/2022 | Shetty et al. | |

| | | | | |
|---|---|---|---|---|
| 11,544,744 | B2 | 1/2023 | Khoury et al. | |
| 2004/0243930 | A1 * | 12/2004 | Schowtka | G06F 40/106 |
| | | | | 715/255 |
| 2007/0136663 | A1 | 6/2007 | Grigoriadis et al. | |

(Continued)

OTHER PUBLICATIONS

Y. W. Chen, Y. W. Chiu, Y. S. Liu, C. Y. Huang and Y. C. Shen, "AI Powered Multi-model Content Creation For Virtual Gallery Using Learning Machine," 2023 IEEE 14th Annual Ubiquitous Computing, Electronics & Mobile Communication Conference (UEMCON), New York, NY, USA, 2023, pp. 0704-0709 (Year: 2023).*

(Continued)

*Primary Examiner* — Ilana L Spar
*Assistant Examiner* — Melinda Gieringer
(74) *Attorney, Agent, or Firm* — Goldstein Law Offices, P.C.

(57) ABSTRACT

A digital content generation platform for automating creation of a digital product, the platform comprising a product generation module, a content database, and a structure library. The content database contains content elements organized according to a classifier scheme, and the structure library contains structure elements which define a product layout of the digital product. The user selects a classifier and a structure element. The product generation module defines the product layout and content fields based on the classifier and structure element, and retrieves content elements from the content database to populate the digital product. The platform further allows the user to define a new classifier not present in the content database, and is configured to generate a new set of content elements for the new classifier using a generative AI application. The platform further employs user feedback to improve the quality of the generated content.

15 Claims, 19 Drawing Sheets

(56) References Cited

U.S. PATENT DOCUMENTS

| | | | |
|---|---|---|---|
| 2008/0177708 A1 | 7/2008 | Ayyar et al. | |
| 2010/0180200 A1* | 7/2010 | Donneau-Golencer | ................... G06Q 10/10 715/705 |
| 2013/0108179 A1 | 5/2013 | Marchesotti et al. | |
| 2018/0253409 A1* | 9/2018 | Carlson | ................. G06F 40/205 |
| 2018/0341990 A1* | 11/2018 | Bardin | .............. G06Q 30/0273 |
| 2020/0167523 A1* | 5/2020 | de Mello Brandao | ................... G06F 40/186 |
| 2020/0380067 A1 | 12/2020 | Religa et al. | |
| 2021/0064690 A1 | 3/2021 | Li et al. | |
| 2021/0166269 A1* | 6/2021 | Joseph | .............. G06Q 30/0276 |
| 2021/0224858 A1* | 7/2021 | Khoury | ............. G06Q 30/0276 |
| 2023/0281673 A1* | 9/2023 | Gupta | ............... G06Q 30/0276 705/14.72 |
| 2024/0312087 A1* | 9/2024 | Agrawal | ................. G06F 40/40 |
| 2024/0378375 A1* | 11/2024 | Coate | ...................... G06F 40/18 |
| 2024/0394754 A1* | 11/2024 | Mokadam | ............. G06V 10/70 |

OTHER PUBLICATIONS

Y. W. Chen, Y. W. Chiu, Y. S. Liu, C. Y. Huang and Y. C. Shen, "AI Powered Multi-model Content Creation For Virtual Gallery Using Learning Machine," 2023 IEEE 14th Annual Ubiquitous Computing, Electronics & Mobile Communication Conference (UEMCON), New York, NY, USA, 2023, pp. 0704-0709 (Year: 2023).*

Amazon Staff, "Amazon rolls out AI-powered image generation to help advertisers deliver a better ad experience for customers", Oct. 25, 2023, accessed at https://www.aboutamazon.com/news/innovation-at-amazon/amazon-ads-ai-powered-image-generator. (Year: 2023).*

L. Lo et al., "DiffAds: An Interactive Platform for Personalized Visual Advertisement Generation," 2023 IEEE International Conference on Multimedia and Expo Workshops (ICMEW), Brisbane, Australia, 2023, pp. 514-515, doi: 10.1109/ICMEW59549.2023. 00100 (Year: 2023).*

Farseev, Aleksandr, et al. "Somin. ai: Personality-driven content generation platform." Proceedings of the 14th ACM international conference on Web search and data mining. 2021. (Year: 2021).*

* cited by examiner

DIGITAL CONTENT GENERATION AND REFINEMENT PLATFORM

TECHNICAL FIELD

The present disclosure relates generally to a platform which automatically generates a digital product. More particularly, the present disclosure relates to a digital content generation platform which utilizes a library of existing content in conjunction with generative artificial intelligence to create and populate a digital product based on a user-defined subject.

BACKGROUND

Creating digital products, such as digital publications and web pages, has traditionally been a time consuming process which requires a person to write the contents of the product and prepare the graphical design and layout. Recent advances in the field of generative artificial intelligence have allowed content creators to automatically create passages of text content using the capabilities of large language models such as Chat GPT. However, working directly with generative AI applications is often an iterative affair which requires the user to carefully inspect AI-generated content for accuracy and relevance, and regenerate or manually edit portions of the text which are unsuitable. Furthermore, learning the capabilities and limitations of a particular generative AI application involves a steep learning curve.

Therefore, a need exists for an internet-based platform which allows a user to automatically create a digital product by supplying minimal information, such as defining a subject and format. The platform would construct a product layout based on the subject and format, and then populate the product layout with text content. Such a platform would draw upon a content library of categorized content sets, but would have the ability to generate new content using generative AI in order to augment or expand the content library. The platform would make it unnecessary for the user to interact directly with the generative AI application. Furthermore, the platform would utilize aggregate feedback gathered from the userbase to improve the generative capabilities of the platform.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a platform which allows a user to automatically create a digital product by selecting a topic or subject. Accordingly, the present disclosure provides a digital content generation platform comprising a control server having an interface module, a product generation module, and a content data module having a content database and a structure library. The content database comprises a plurality of content elements which are organized according to a classification scheme which allows the content to be referenced using classifiers which describe a concept, subject, or topic. The classifiers are hierarchically organized with first level classifiers describing information in a broad scope, while sub-classifiers serve to narrow the scope of the information described by the first level classifiers. The structure library contains structure elements, including templates and content fields, which will be used to define a product layout of the digital product. The digital content generation platform allows the user to select one or more classifiers and structure elements, causing the product generation module to define the product layout of the digital product, identify the content fields, and retrieve the content elements from the content database which will be used to populate the content fields.

It is another aspect of an example embodiment in the present disclosure to provide a platform which leverages generative artificial intelligence to produce content. Accordingly, the control server further has a machine learning module configured to send instructions to a generative AI application to generate new content elements. The digital content generation platform allows the user to define a new classifier, and leverages the generative AI application to create new sets of content elements which will be used to generate digital products embodying the new classifier.

It is yet another aspect of an example embodiment in the present disclosure to provide a platform which utilizes user feedback to improve the generative capabilities of the platform. Accordingly, the digital content generation platform has a preview interface which is configured to display a range of previews of the digital product, which display different selections of structure elements and content elements which can be used to create the digital product. The preview interface allows the user to submit user feedback to approve or reject structure elements which have been suggested by the platform to be used in combination with the defined classifiers, and approve or reject content elements which have been suggested to populate each content field of the product layout. This allows the content database to be improved by indicating which content elements are desirable for a given set of classifiers and structure elements, thus increasing the likelihood that future combinations of structure elements and content elements will be deemed favorable by the users.

It is still a further aspect of an example embodiment in the present disclosure to provide a platform which reduces time spent waiting for the generative AI to generate or refresh content elements. Accordingly, when the user defines a new classifier not described in the content database, the product generation module is configured to immediately submit content element requests to the machine learning module directed to a plurality of candidate structure sets, with the goal of pregenerating sufficient new content elements via the generative AI application to form a content variation pool for each content field associated with each of the potential structure sets. The pregeneration process is timed to occur as a background process while the user views structure previews embodying the candidate structure sets prior to approving one or more of the candidate structure sets. The content elements pregenerated via the generative AI application are held within temporary storage, and requests to populate a content field or refresh a rejected content element can be carried out by retrieving the pregenerated content elements from the content variation pool for the content field.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1A:
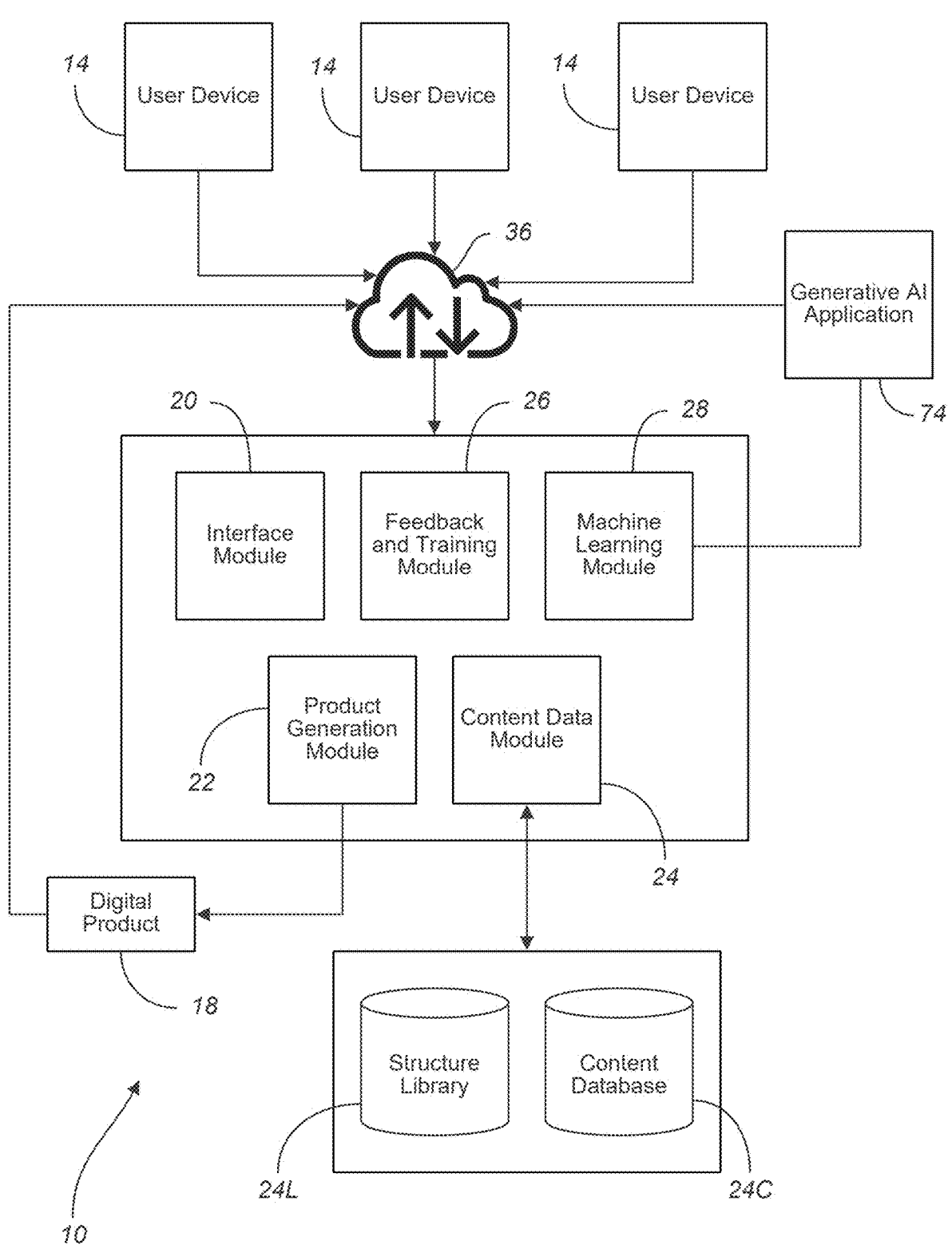
FIG. 1A is block diagram depicting a digital content generation platform, in accordance with an embodiment in the present disclosure.
Figure 1B:
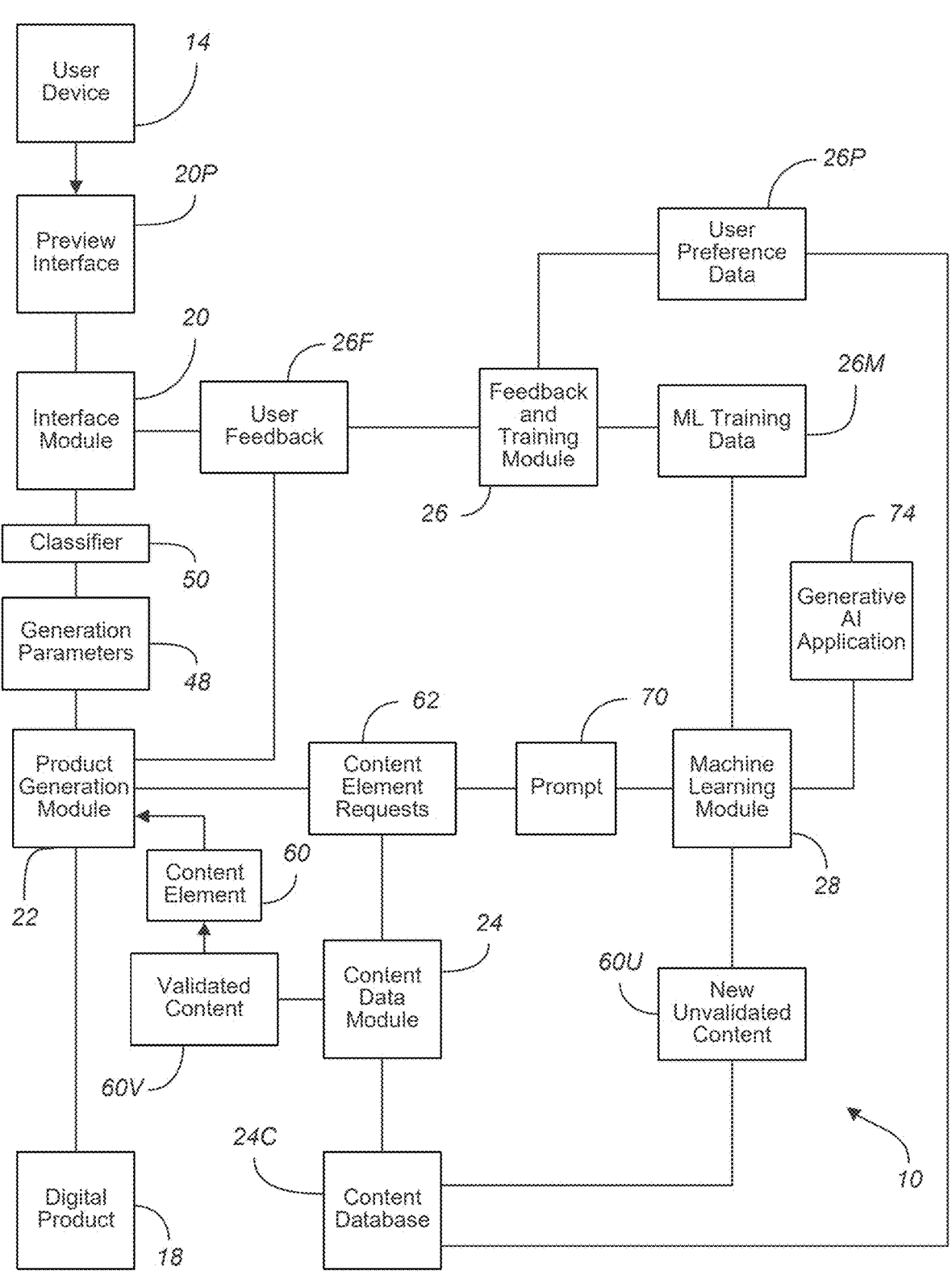
FIG. 1B is block diagram depicting the platform modules of the digital content generation platform which operate together to generate a digital product, in accordance with an embodiment in the present disclosure.

FIGS. 1A-B illustrate a digital content generation platform 10 which is adapted to automatically generate a digital product 18 incorporating both graphical content and text content, using only minimal input from a user, such as a classifier 50 which specifies a subject or category. The digital content generation platform 10 is configured to populate a digital product 18 using content which is retrieved from a content database 24C containing validated content elements 60V, or which is generated on demand using generative artificial intelligence. The digital content generation platform 10 is further adapted to employ user feedback 26F to improve the favorability of the validated content elements 60V stored by the platform, as well as the favorability of content elements produced using generative artificial intelligence (AI).

Figure 1C:
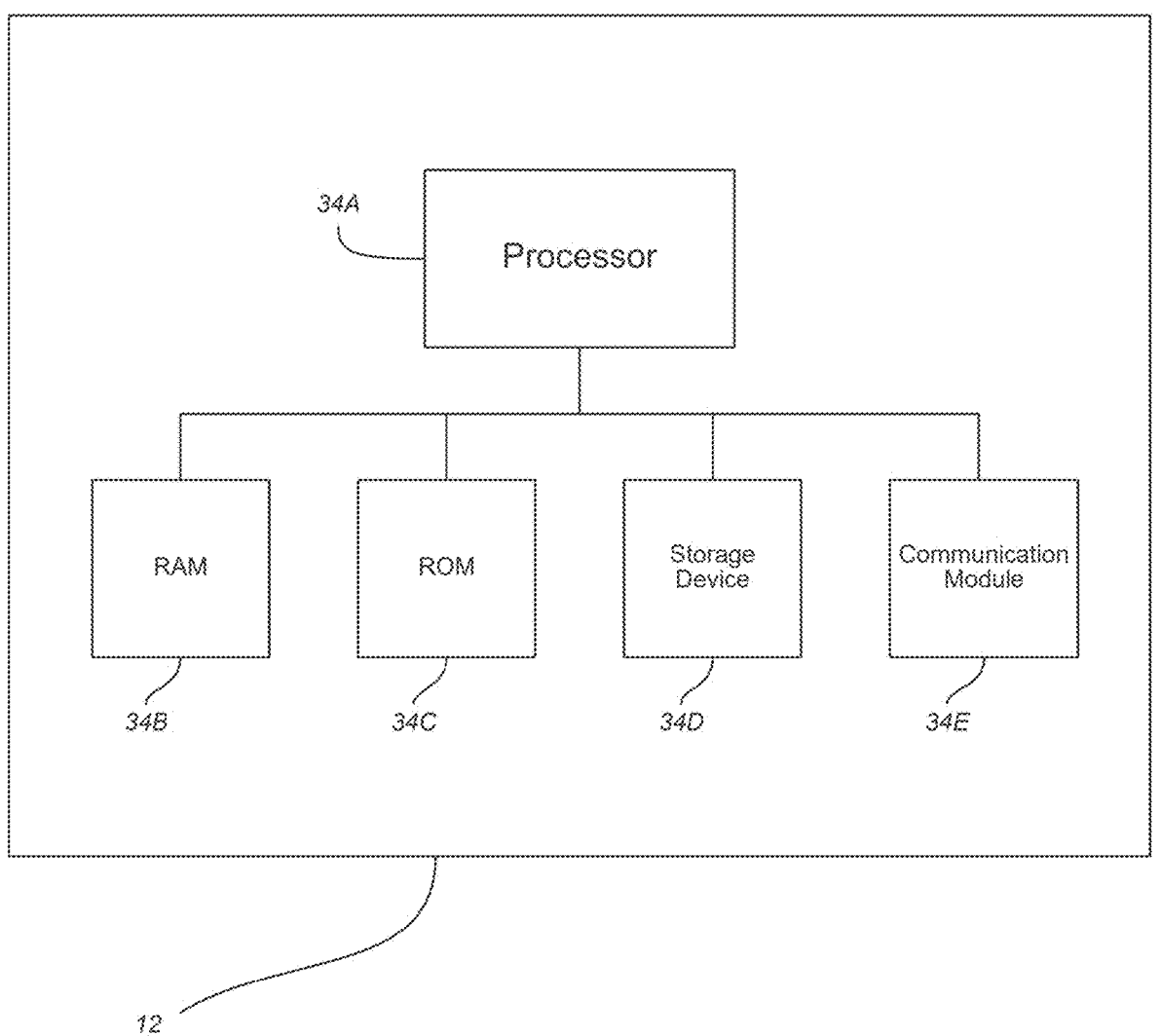
FIG. 1C is a block diagram depicting an exemplary control server architecture, in accordance with an embodiment in the present disclosure.

Turning to FIG. 1C while continuing to refer to FIGS. 1A-B, in an embodiment, the digital content generation platform 10 comprises a control server 12 operably connected to a data communication network 36 such as the internet. The digital content generation platform 10 has a plurality of users, who each access the platform through the data communication network 36 via a user device 14. Each user device 14 can be a personal computer, smartphone, tablet computer, or other computing device which has a digital display capable of displaying a graphical user interface, is configured to accept user input via an input device, and is capable of communicating with the control server 12 via the data communication network 36.

In an embodiment, the control server 12 is a computing device having a processor 34A, a RAM 34B, a ROM 34C, a computer storage device 34D, and a communication module 34E. The control server 12 may be implemented using server-grade hardware capable of processing a high volume of concurrent content generation processes.

In one embodiment, the control server 12 comprises a plurality of platform modules which are each configured to execute the functions which allow the digital content generation platform 10 to operate. These platform modules may be implemented using software components, packages, or assemblies, which can be executed on the control server 12 or on a separate computing device under the control thereof, as will be apparent to a person of ordinary skill in the art in the field of the invention. In one embodiment, the platform modules comprise an interface module 20, a product generation module 22, a content data module 24, a feedback and training module 26, and a machine learning module 28. The role performed by each platform module will now be described briefly.

Figure 2A:
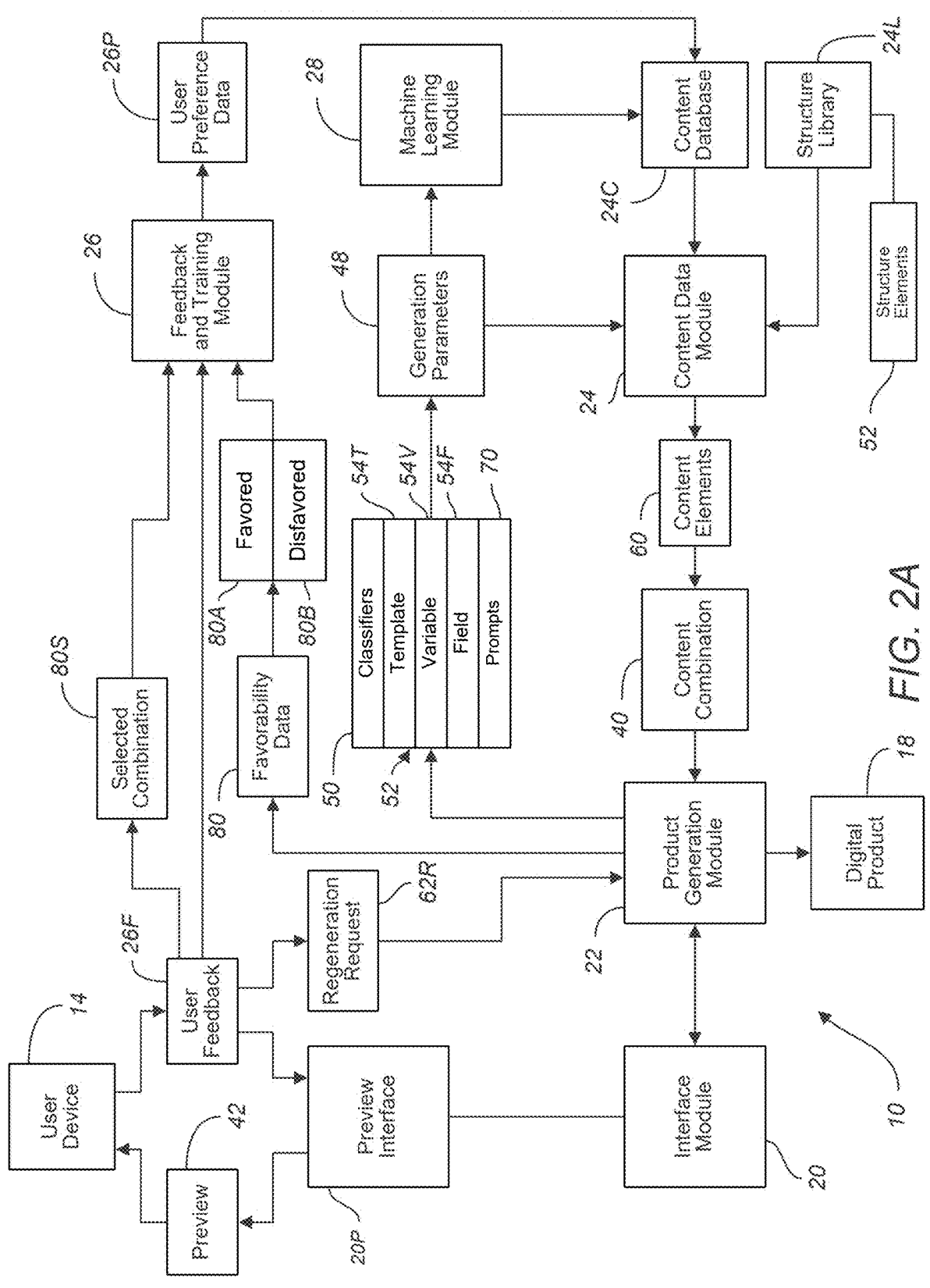
FIG. 2A is a block diagram depicting functional relationships between the various platform modules, in which a product generation module draws existing content elements from a content data module, or newly generated content elements from a machine learning module, in accordance with an embodiment in the present disclosure.

Referring to FIG. 2A while also referring to FIGS. 1A-B, the interface module 20 is adapted to generate a preview interface 20P which is accessible to the user via the user device 14. In one embodiment, the preview interface 20P can be presented within a platform application configured for local execution on the user device 14, or within a platform website or other web-based portal accessible to the user device 14 via the data communication network 36. The preview interface 20P can be configured to implement a plurality of sub-interfaces which are focused around platform functions which present information to the user and collect user input from the user at different steps within a content generation and refinement process. One function of the interface module 20 is to collect user input which will be used to define one or more generation parameters 48. For example, the graphical user interface may allow the user to select or define a subject and a layout for the digital product 18, view a preview 42 of the digital product 18, submit user feedback 26F regarding the preview 42, initiate regeneration of portions of the digital product 18, as well as execute other user commands and functions as appropriate.

The product generation module 22 is adapted to carry out the creation of the digital product 18 by using the generation parameters 48 to retrieve the content elements 60 which will be used to populate the digital product 18. In one embodiment, the generation parameters 48 may include a plurality of classifiers 50 and structure elements 52. The structure elements 52 may comprise one or more templates 54T as well as other elements which may provide a framework around which the content elements 60 are to be generated and arranged to complete the digital product 18. In one embodiment, the structure elements 52 define one or more content fields 54F, and each content field 54F is to be populated with one content element 60. Additionally, the structure elements 52 provide further attributes which allow the appropriate content element 60 to be generated and matched to each content field 54F.

The product generation module 22 is adapted to interact with the content data module 24 and the machine learning module 28 to obtain the correct content elements 60. The platform 10 utilizes both content elements 60 which are produced on demand using generative AI as well as an existing repository of content elements 60 organized and managed through the content data module 24. In one embodiment, each content element 60 corresponds to a text string.

The machine learning module 28 is adapted to produce new content elements 60 via a generative artificial intelligence (AI) application 74. In a preferred embodiment, the generative AI application 74 is a generative language model trained using a large dataset to predictively generate natural language outputs in response to receiving a set of instructions in the form of a prompt. An example of a generative AI application 74 is Chat GPT, or Chat Generative Pre-trained Transformer. The machine learning module 28 is adapted to construct a prompt 70 corresponding to instructions, code, or commands which will instruct the generative artificial intelligence application 74 to generate a desired output. For example, the generative AI application 74 may be instructed to generate a passage of text related to a subject described by the classifier 50. The resulting newly generated output is considered new unvalidated content 60U as the content element 60 has not yet been evaluated for accuracy, suitability, or desirability, and the user may choose to reject, edit, or regenerate the newly generated content. The content produced via the generative AI application 74 may be validated and stored for future retrieval, through analysis of user feedback 26F which is provided by the feedback and training module 26.

The content data module 24 is adapted to maintain and organize the content elements 60 within a content database 24C. The content database 24C may also maintain a structure library 24L containing structure elements 52 which are used to define the product layout of the digital product 18. The content database 24C associates each content element 60 with one or more classifiers 50 and structure elements 52, thus allowing content elements 60 to be matched to the generation parameters 48 to facilitate retrieval by the product generation module 22.

The content database 24C allows validated content 60V to be retrieved for use by the product generation module 22, without requiring the content items 60 to be generated on demand using the generative AI application. In a preferred embodiment, the product generation module 22 will prioritize retrieval of validated content 60V. Content elements 60 can be generated via the generative AI application 74 when the validated content 60V lacks sufficient content elements 60 which match the generation parameters 48.

Once the product generation module 22 has retrieved the content elements 60, a preview 42 is created and presented to the user via the preview interface 20P. The preview 42 shows the digital product 18 or a portion thereof, which has been populated with content elements 60. For example, the preview 42 may be a rendering of a portion of a page in a document which shows text content elements 60 arranged alongside aesthetic elements as determined by the structure elements 52. The preview interface 20P allows the user to approve or reject content combinations 40 as well as regenerate content elements 60, whereupon the product generation module 22 may request a different content element 60 to replace the rejected content element 60. These actions are incorporated into the user feedback 26F which is processed by the feedback and training module 26. The feedback and training module 26 quantifies the initial selection of generation parameters 48 as well as subsequent user feedback 26F to improve the associations between the content elements 60 and content combinations 40 within the content database 24C, and to improve the quality of new content produced by the generative AI application 74.

Figure 2B:
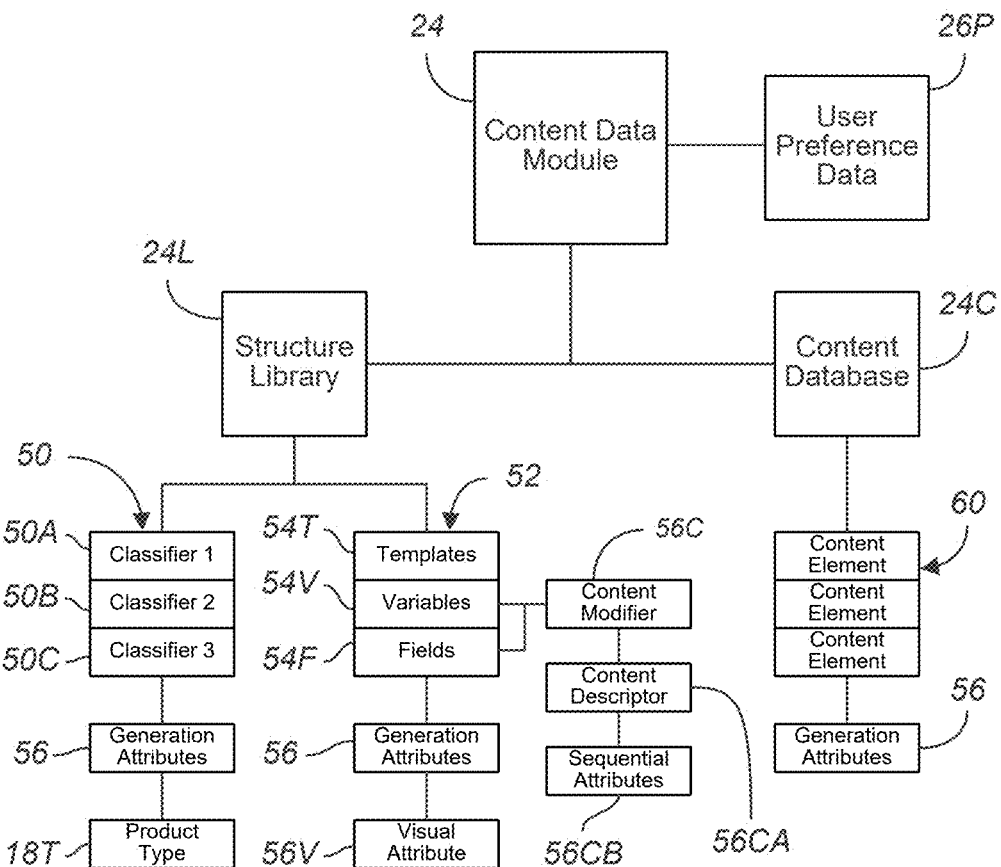
FIG. 2B is a block diagram showing a structure library for organizing classifiers and structure elements used to generate the digital product, and a content database for storing and organizing the content elements which will be used to populate the digital product, in accordance with an embodiment in the present disclosure.

Turning to FIG. 2B while continuing to refer to FIGS. 1A-B and FIG. 2A, an embodiment exemplifying the organization of content elements 60 within the digital content generation platform 10 will be examined in greater detail. In one embodiment, the structure library 24L manages a plurality of classifiers 50 which are hierarchically related. The classifiers 50 comprise one or more first level classifiers 50A, and each first level classifier is related to a plurality of sub-classifiers of increasing specificity, comprising second level classifiers 50B, third level classifiers 50C, and additional sub-classifiers. Classifiers 50 correspond to information descriptors which describe various subjects or concepts under which individual information items can be collected or categorized.

In one embodiment, each first level classifier 50A represents information descriptors which are broad in scope, while each sub-classifier serves to narrow the scope of the first level classifier 50A, by being associated with information descriptors of increasing specificity. Each successive level of sub-classifier will narrow the scope of the preceding level of classifier 50. For example, a second level classifier 50B will narrow a first level classifier 50A, while a third level classifier 50C will narrow a second level classifier 50B. Additional levels of sub-classifiers, such a fourth or fifth level classifier, may be represented in the structure library 24L where appropriate. Each set of generation parameters 48 therefore includes at least one classifier 50. The classifier 50 and sub-classifiers within the generation parameters 48 may collectively be referred to as a classifier grouping.

In one embodiment, the first level classifiers 50A may each represent a subject, while some of the second level classifiers 50B may represent a concept or topic which can be used to narrow the subject of the first level classifier 50A. In one illustrative example, a first level classifier 50A may correspond to "Business", while two of its associated second level classifiers 50B may correspond to "Budgeting", and "Personal Finance" respectively. In this example, each second level classifier 50B is conceptually linked to the first level classifier 50A, and serves to narrow the scope of the first level classifier 50A.

Furthermore, certain sub-classifiers may be associated with more than one first level classifier 50A. Some sub-classifiers may be highly specific and are linked to a limited number of classifiers 50, while other sub-classifiers may be broadly applicable. For example, there may be a sub-classifier which corresponds to "Course Creator". This sub-classifier may be allocated to any level of sub-classifier, as it describes a concept which seeks to present the information items associated with the preceding classifiers and sub-classifiers in the manner of an instructional course. For example, the "Course Creator" sub-classifier may be grouped with the first level classifier 50A "Business" and the second level classifier 50B "Personal Finance". The "Course Creator" sub-classifier may also be grouped with an exemplary first level classifier 50A and second level classifier 50B of "Art" and "Landscape Painting" respectively.

In one embodiment, the structure library 24L may contain one or more generation attributes 56 which can be associated with one or more classifiers 50. Generation attributes 56 may be used to define attributes which are unrelated to the classification or description of information. In one embodiment, a generation attribute 56 may be used to denote a product type 18T, which may then cause specific structure elements 52 to be selected which are appropriate to the defined product type 18T.

Figure 2C:
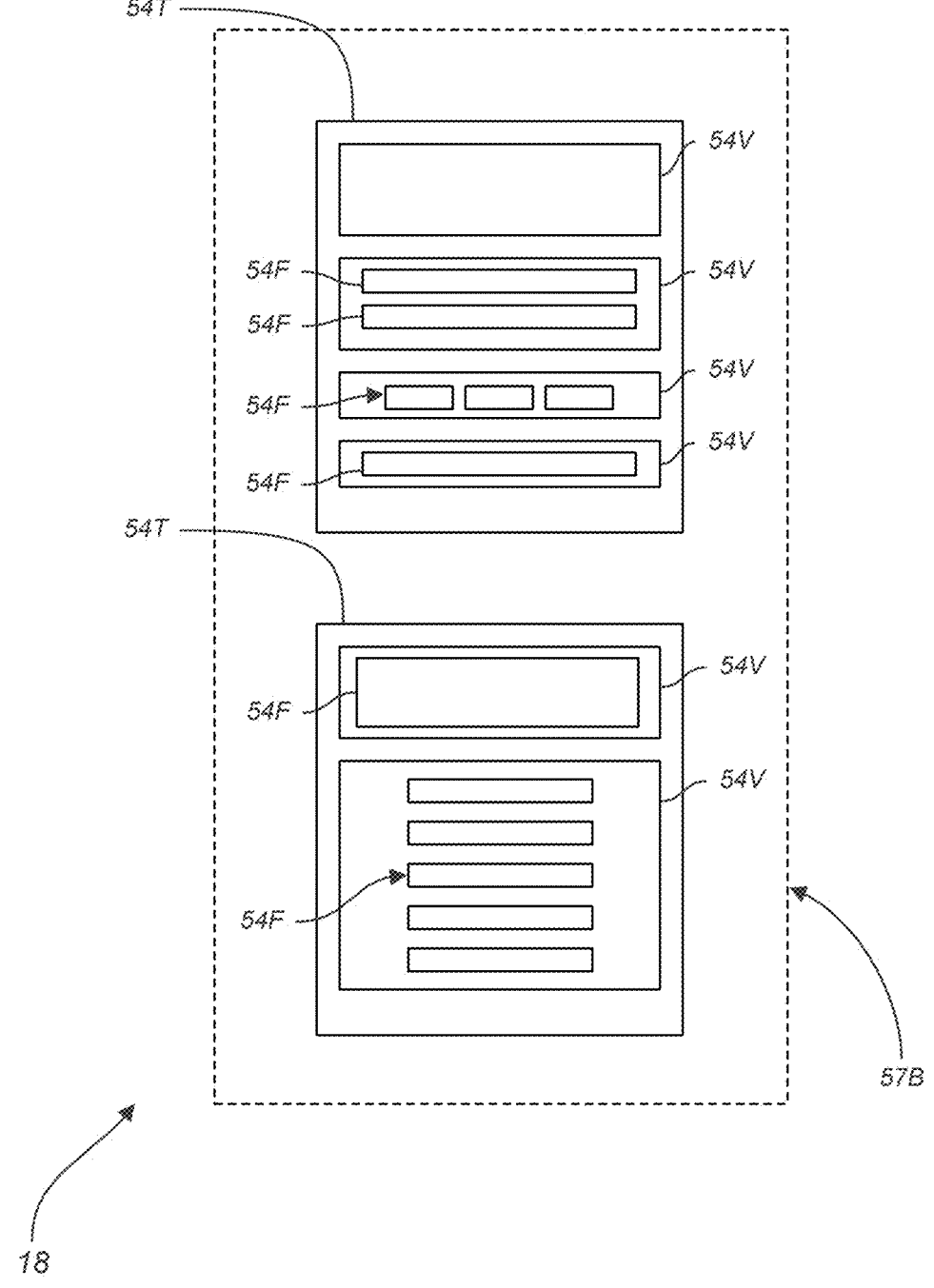
FIG. 2C is a block diagram showing an example digital product layout in graphical form, in accordance with an embodiment in the present disclosure.

Referring to FIG. 2C while continuing to refer to FIGS. 1A-B, and FIGS. 2A-B, in addition to the classifiers 50, the structure library 24L may be configured to maintain a repository of structure elements 52. In one embodiment, the structure elements 52 comprise a plurality of templates 54T and variable components 54V. A template 54T may contain layout data which defines the digital product's 18 appearance. For example, a template 54T may define one or more pages, with each page having dimension data. The dimension data may be used to define page boundaries, and may further define the quantity, appearance, and/or position of additional structure elements 52 which are contained within the page.

Furthermore, templates 54T can be organized into a batch 57B comprising one or more templates 54T. A batch 57B provides further organizational structure to the digital product 18. For example, each batch 57B may have a distinct set of classifiers 50 or sub-classifiers, thus allowing the digital product 18 to be divided into distinct components or sections. For example, a first batch 57B and a second batch 57B may share a first level classifier 50A and a second level classifier 50B, but each batch 57B in this example may have a distinct third level classifier 50C.

In one embodiment, the structure elements 52 further comprise a plurality of variable components 54V, and each template 54T may contain one or more variable components 54V, which may further be distributed across the one or more pages defined by the template 54T. Each variable component 54V may comprise one or more fields 54F, and each field 54F will be populated with a content element 60. The digital product 18 may therefore be constructed by populating the templates 54T of the product with the appropriate variable components 54V having fields 54F.

In one embodiment, a variable component 54V may also define a particular theme or layout configuration to the fields 54F contained within the variable component 54V. Each variable component 54V may be associated with one or more content modifiers 56C. The content modifier 56C of each variable component 54V serves to further modify the scope of the information associated with the classifiers 50 contained within the classifier grouping. The classifiers 50 and sub-classifiers of the generation parameters 48 define the overall scope of the information which will be used to populate the digital product 18, while the structure elements 52 influence the specific information that will be requested by the product generation module 22 as well as the position of each content element 60 within the digital product 18 as determined by the dimension data of each template 54T. In effect, the content modifier 56C allows each variable component 54V to be populated by a subset of information within the wider pool of information defined by the classifiers 50 within the classifier grouping, thereby operating as building blocks around which the digital product 18 is constructed.

The content modifier 56C of the variable component 54V therefore affects the selection of content that will be used to populate each field 54F. In one embodiment, the content modifier 56C defines a content descriptor 56CA which modifies the information that will be used to populate the fields 54F, and may further define a sequential attribute 56CB which in turn defines an ordered sequence in which each field 54F must be arranged. A content descriptor 56CA can be applied to some, or all of the fields 54F within the variable component 54V. For example, each field 54F within the variable component 54V can be assigned a specific content descriptor 56CA.

In one embodiment, examples of content modifiers 56C may comprise a checklist, instructional sequence, ranked list, summary, detailed discussion, or other conceptual modifier which associates the variable component 54V with a thematic purpose. The aforementioned examples, as well as other concepts, may be implemented by associating content descriptors 56CA and sequential attributes 56CB to the individual fields 54F.

For example, when the content modifier 56C corresponds to an instructional sequence, the fields 54F within the variable component 54V may be arranged as a sequential list, and each field 54F will be populated with an appropriate content element 60. Continuing with the illustrative example, the instructional sequence may therefore be used to direct the product generation module 22 to request a series of content elements 60 each corresponding to one step within a process for teaching "Landscape Painting". The content descriptors 56CA may cause each field 54F to be populated with one of the steps of the process or painting landscape paintings, while the sequential attributes 56CB may cause the steps to be arranged in the correct sequence across the fields 54F of the variable component 54V.

In one embodiment, the structure elements 52 may be further modified by a generation attribute 56, such as a visual attribute 56V, which may allow the appearance of any of the structure elements 52 to be defined separately from the template 54T. In addition, the generation attributes 56, such as the product type 18T, may also determine which structure elements 52 can be incorporated into the generation parameters 48.

In some embodiments, the product type 18T (see FIG. 2B) can be used to define various alternative digital products, including, but not limited to, web pages, advertisements, and marketing emails and communications. These product types 18T can be represented through specific sets of structure elements 52, such as specialized templates 54T and variable components 54V, which provide the necessary layout and content modifiers 56C to allow the product generation module 22 to retrieve the relevant content elements 60 with which to populate the content fields 54F defined by the structure elements 52. Furthermore, the product generation module 22 can be configured to create digital products 18 of different product types 18T but which share common aesthetic and thematic elements. For example, an ancillary digital product can be created which automatically incorporates structure elements 52 which are necessary for the product type 18T of the ancillary product but which are also aesthetically or thematically linked to the structure elements 52 and classifiers 50 selected to define the main digital product 18.

Figure 2D:
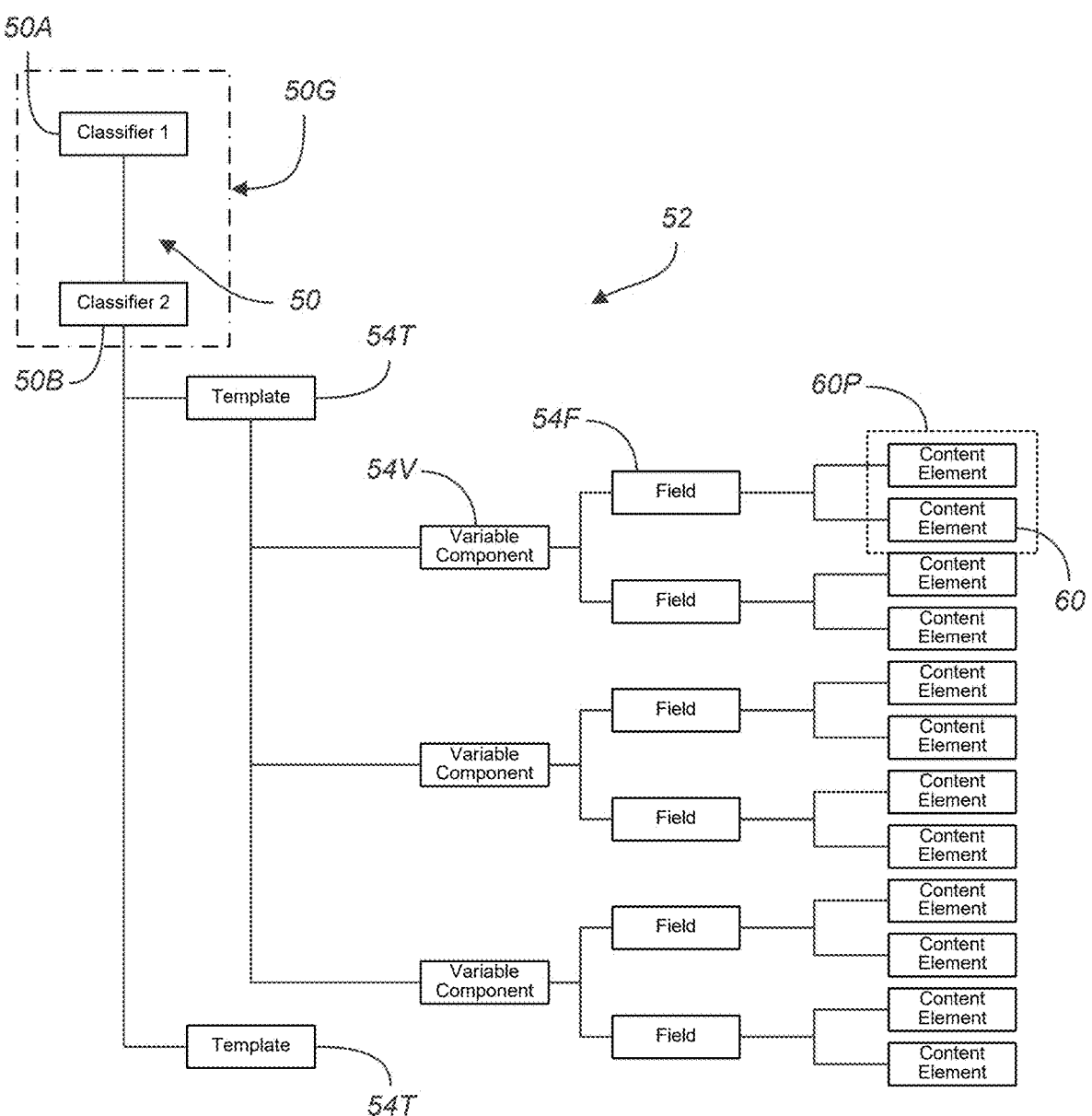
FIG. 2D is a block diagram showing an exemplary arrangement of structure elements which form the product layout of the digital product, further showing a content variation pool containing possible content elements for each content field, in accordance with an embodiment in the present disclosure.
Figure 2E:
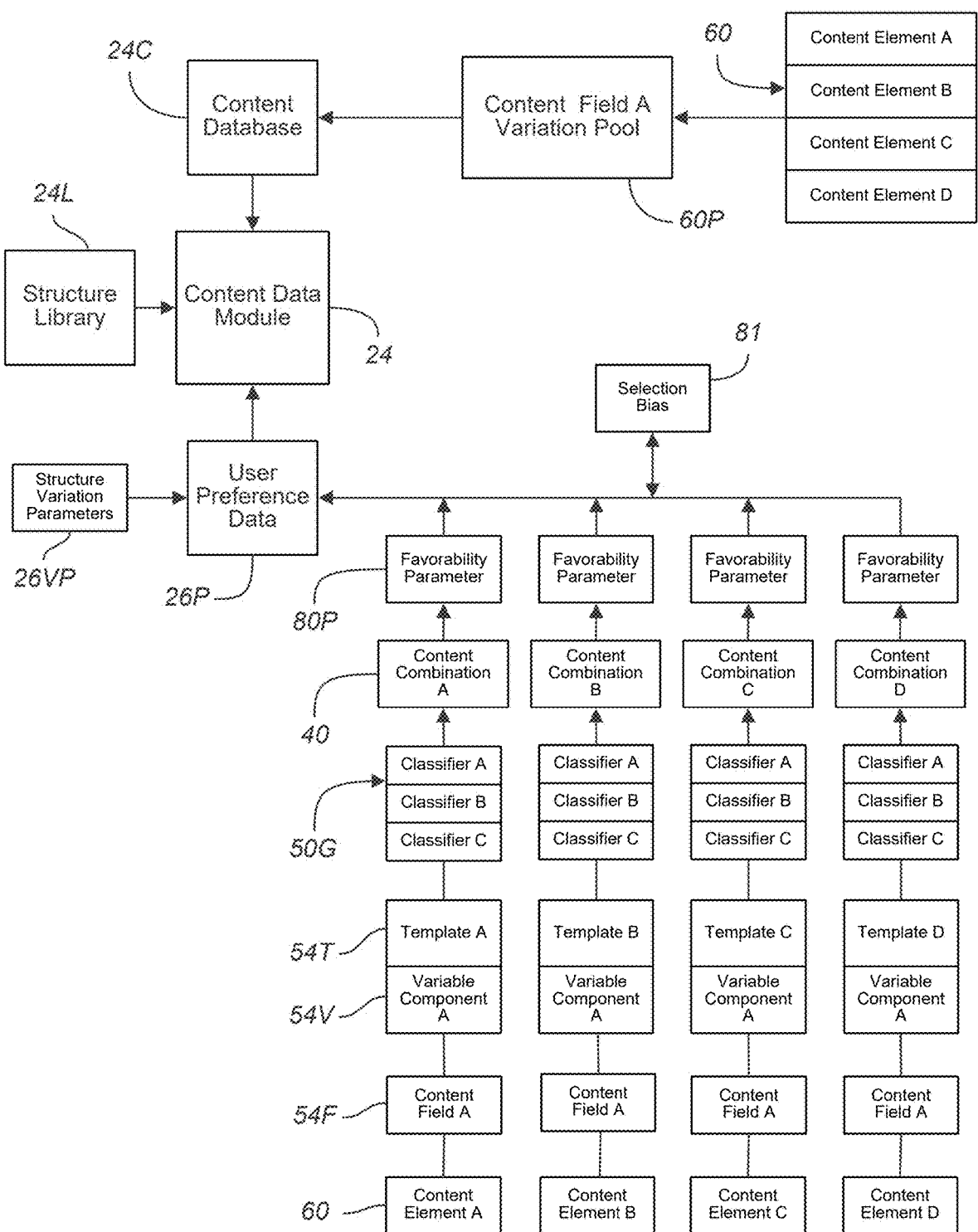
FIG. 2E is a block diagram illustrating favorability of content combinations within a content variation pool, in accordance with an embodiment in the present disclosure.

Turning to FIGS. 2D-E while also referring to FIGS. 1A-B and FIGS. 2A-C, the content database 24C maintains and organizes a repository of content elements 60 to facilitate retrieval by the product generation module 22. The content database 24C is organized to allow individual content elements 60 to be linked to classifiers 50 or structure elements 52 in a manner that allows the appropriate content elements 60 to be identified and retrieved in response to a query containing a set of generation parameters 48. In one embodiment, the content database 24C may be implemented in the form of a relational database, multidimensional database, or other data storage implementation as appropriate.

Content matching between content elements 60 and fields 54F can be executed using various matching criteria, at different levels of precision. In one embodiment, the generation parameters 48 identify the classifiers 50 within the classifier grouping, and the structure elements 52 which are used to define the content fields 54F to be populated. In one embodiment, a content element 60 can be matched to the content field 54F if the content element is associated with at least one classifier 50 and at least one structure element 52 within the generation parameters 48 of the content field 54F.

To increase potential precision or accuracy of the content match, additional matching criteria may be employed. In one embodiment, a content element 60 can be matched to the content field 54F if the content element 60 is associated with every classifier 50 present within the classifier group, in addition to the variable component 54V and to which the content field 54F belongs, and the content modifiers 56C applicable thereto.

In one embodiment, the content database 24C is structured to associate each classifier 50, including sub-classifiers, with a subset of the content elements 60 comprising a classifier pool. At the broadest level, each content element 60 within the classifier pool is associated with a first level classifier 50A. The scope of information reflected within a content element 60 of the classifier pool can be narrowed by associating it with a sub-classifier that is hierarchically linked to a first-level classifier 50A, thus creating subsets within the classifier grouping of increasing specificity.

In one embodiment, the content database 24C may be configured to link the content elements 60 within a classifier pool with various structure elements 52, such as templates 54T and variable components 54V. Furthermore, the content database 24C may link content elements 60 with individual content modifiers 56C and content descriptors 56CA which are associated with individual content fields 54F. In one example where the content database 24C contains a fully populated classifier pool for a given classifier grouping 50G, every content field 54F belonging to a variable component 54V selectable in combination with the classifier grouping 50G, will be associated with at least one content element 60 within the classifier pool. In addition, such content elements 60 will be associated with the applicable content modifiers 56C of the content field 54F.

In one embodiment, the content data module 24 is adapted to determine whether a content match is present between a content field 54F and one or more content elements 60 within the content database 24C. For a given content field 54F, the subset of content elements 60 within the classifier pool which are associated with the content field 54F and the content modifiers 56C associated therewith, comprise a content variation pool 60P. Each content element 60 within the content variation pool 60P can potentially be used to populate the content field 54F. The content variation pool 60P may be drawn from the validated content 60V within the content database 24C.

When a content element 60 can be potentially selected to populate a content field 54F, the content element 60 may form a content combination 40 which associates the content element 60 with the classifier grouping 50G and at least one structure element 52. Typically, the structure element 52 is a content field 52F, potentially combined with the variable component 54V with which the content field 52F is associated.

In one embodiment, the content data module 24 maintains user preference data 26P, which is utilized by the platform to select specific content elements 60 within the content variation pool 60P in order to populate each content field 54F. The user preference data 26P corresponds to an aggregation of data obtained from user feedback 26F and through analysis of completed digital products 18 (represented as structure variation parameters 26VP, for example), which can be used to quantify favorability of content combinations

40. The user preference data 26P may thus serve to predict how likely a user will be to approve the selection of the content element 60 within the content combination 40. Forming a content combination 40 therefore allows the digital content generation platform 10 to track whether it is desirable to select the content element 60 to populate the content field 54F, in light of the other structural elements 52 within the content combination 40. In one embodiment, the content database 24C may associate each content combination 40 with a set of favorability parameters 80P.

In a preferred embodiment, user feedback 26F may be employed to indicate whether a particular content combination 40 is favored 80A or disfavored 80B, thus allowing a favorability parameter 80P to be determined for each content combination 40. The favorability parameter 80P for each content combination 40 is updated continuously as additional user feedback 26F is received and processed through the digital content generation platform 10. The favorability of each content combination 40 can be assessed through a variety of different metrics, at different levels of granularity. In one embodiment, the favorability of a content combination 40 can be quantified using one or more favorability parameters 80P. In certain embodiments, the favorability parameters 80P may include or exclude layout or aesthetic considerations. For example, layout or aesthetic considerations can be excluded by only considering the structure elements 52 of content field 54F, the content modifiers 56C which apply to the content field 54F, and the variable component 54V with which the content field 54F is a part of.

To consider layout or aesthetic considerations, the favorability parameters 80P may be adjusted to incorporate the templates 54T and any associated layout data or dimension data. Thus, the favorability of the content combination 40 will be affected by comparing the content element 60 with the relevant structure elements 52. In one example, the applicable template 54T may define a relatively limited amount of space into which the content element 60 will be placed—such as within a relatively compact text box or other layout component. In such an example, the consideration of the template 54T within the content combination 40 may significantly decrease the probability that a lengthy text string will be selected as the content element 60 used to populate the content field 54F.

The favorability parameters 80P of the content combination 40 may reflect the desirability of selecting the content element 60 relative to the other content elements 60 within the content variation pool 60P. As such, the content element 60 belonging to the content combination 40 with the highest favorability parameters 80P may have an increased probability of being selected to populate the content field 54F. In one embodiment, the favorability parameters 80P of each content combination 40 associated with the content variation pool 60P may be assessed to produce a selection bias 81, which may then be used to influence which content combination 40 is selected to populate the content field 54F. The selection bias 81 may also reflect other parameters which extend beyond comparing the content elements 60 within the content variation pool 60.

Figure 2F:
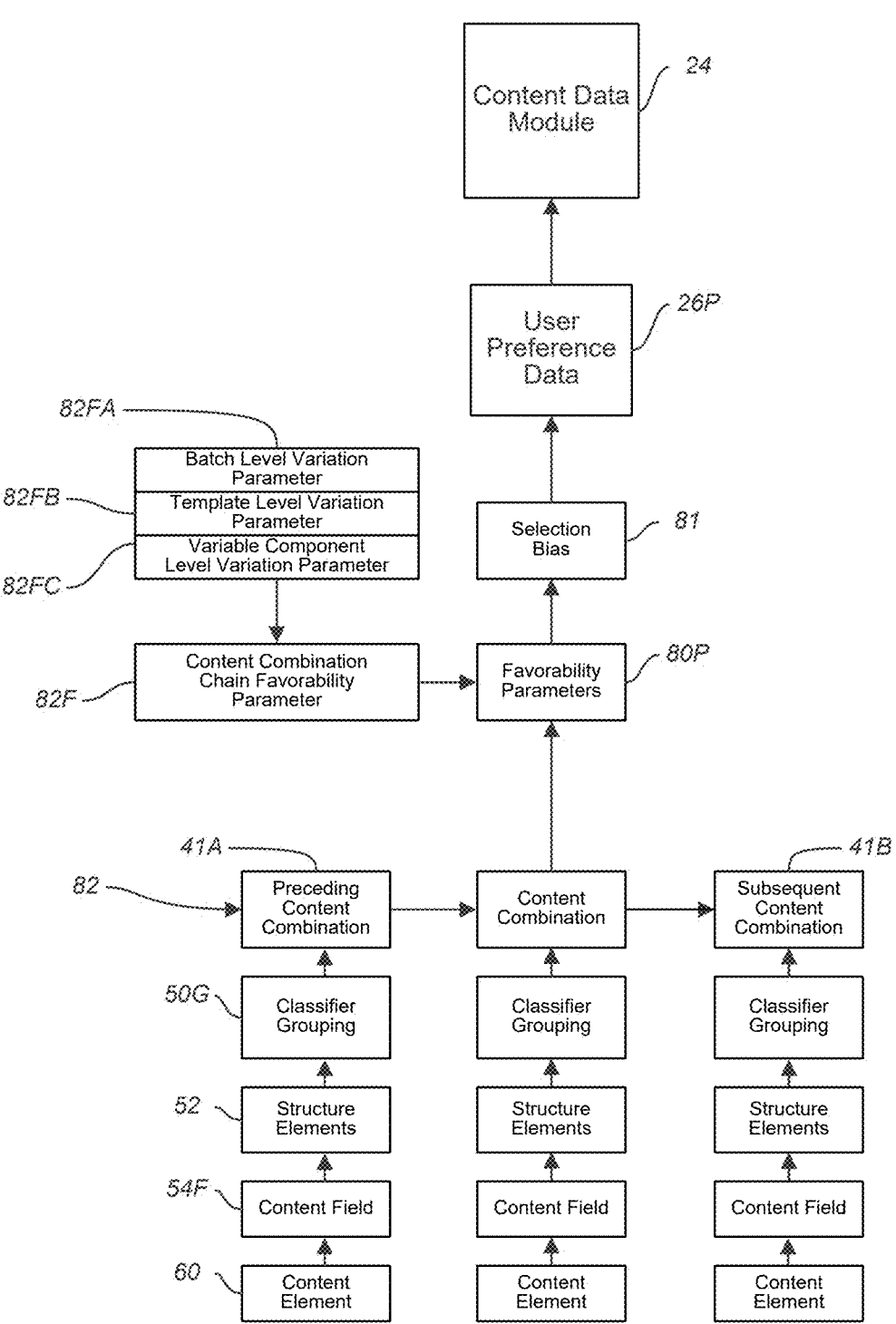
FIG. 2F is a block diagram illustrating how content combinations can be grouped into content combination chains, in which favorability of each content combination is determined by the composition of the content combination chain, in accordance with an embodiment in the present disclosure.

Referring to FIG. 2F while also referring to FIG. 1B and FIGS. 2A-2E, the favorability of a content element 60 within a content element pool 60P may also be dependent on the overall composition of the digital product 18 or components thereof, as reflected by the structure elements 52. For example, the content elements 60 used to populate content fields 54F in one variable component 54V may influence the favorability of content elements 60 which can be selected to populate another variable component 54V within the same template 54T.

In one embodiment, the content combinations 40 associated with a plurality of related content fields 54F may be grouped together to form one or more content combination chains 82. A content combination chain 82 allows the favorability of each content combination 40 to be determined based on the composition of the content combination chain 82.

In one embodiment, the favorability parameters 80P of each content combination 40 may include a content combination chain favorability parameter 82F which compares the favorability of the content combination 40 against the composition of the content combination chain 82. The content combination chain favorability parameter 82F thus influences the selection bias 81, which then quantifies the probability that the content combination 40 will be selected.

The selection bias 81 may quantify a probability that a particular content combination 40 will be selected relative to the other content combinations 40 within the content variation pool 60P of the specific content field 54F, by comparing the relative favorability of each of the content combinations 40 against both the content variation pool 60P and the composition of the content combination chain 82 as a whole. This allows the suitability of content elements 60 to be considered in context with individual sections or pages of the digital product 18 or the entirety thereof.

In one embodiment, the content combination chain 82 may be sequentially ordered, comprising a preceding content combination 41A, followed by an intermediate content combination or a subsequent content combination 41B. A preceding content combination 41A associated with a particular content element 60 may thus impact the favorability parameters 80P of the content combinations 60 which follow the preceding content combination 41A in the content combination chain 82. For example, the preceding content combination 41A may either increase or decrease the probability that certain content combinations 40 will be selected to populate the content fields 54F which follow in the sequential order. Similarly, a subsequent content combination 41B may impact the probability that the preceding content combination 41A will be selected. In another example, a preceding content combination 41A may effectively preclude the selection of certain content combinations 40 which follow the preceding content combination 41A.

In one embodiment, the product generation module 22 may be configured to select the content combinations 40 to populate each of the content fields 54F of the content combination chain 82 such that the values of the content combination chain favorability parameters 82F are maximized. This calculation can be employed to maximize the content combination chain favorability parameters 82F at various levels as expressed through the hierarchy of the structure elements 52 which make up the digital product 18 as a whole. In one embodiment, the content combination chain favorability parameter 82F can be used to determine how likely a content combination 40 will be selected based on a comparison with the other content components 40 which make up the composition of the content combination chain 82 at a batch level 82FA, a template level 82FB, or at a variable component level 82FC. For example, a batch level 82FA comparison will consider the probability that the content combination 40 will be selected when compared against the composition of the other content combinations 40 within the batch 57B (see FIG. 3A).

Referring to FIG. 1B, FIG. 2A, and FIGS. 2E-F, in one embodiment, the user preference data 26P is accumulated through analysis of both user interactions with the product generation module 22, as well as the composition of completed digital products 18. For example, when a user is presented with a preview 42 of the digital product 18 or a portion thereof within the preview interface 20P, the user may choose to regenerate one or more content elements 60 or content combinations 40. A regeneration request 62R targeting a content combination 40 indicates that the content combination 40 is disfavored 80B, thus negatively impacting the favorability parameters 80P of the content combination 40 in relation to the content variation pool 60P. Conversely, a content combination 40 which is accepted by the user for incorporation into the digital product 18 will be designated as a favored combination 80A, potentially increasing the probability that the content combination 40 will be selected from amongst the content variation pool 60P.

A completed digital product 18 may be analyzed to determine the content combination chain favorability parameters 82F of each of its constituent content combinations 40 by comparing each content combination 40 against various levels of the digital product 18, such as at the batch level 82FA, template level 82FB, and/or variable component level 82FC.

Figure 3A:
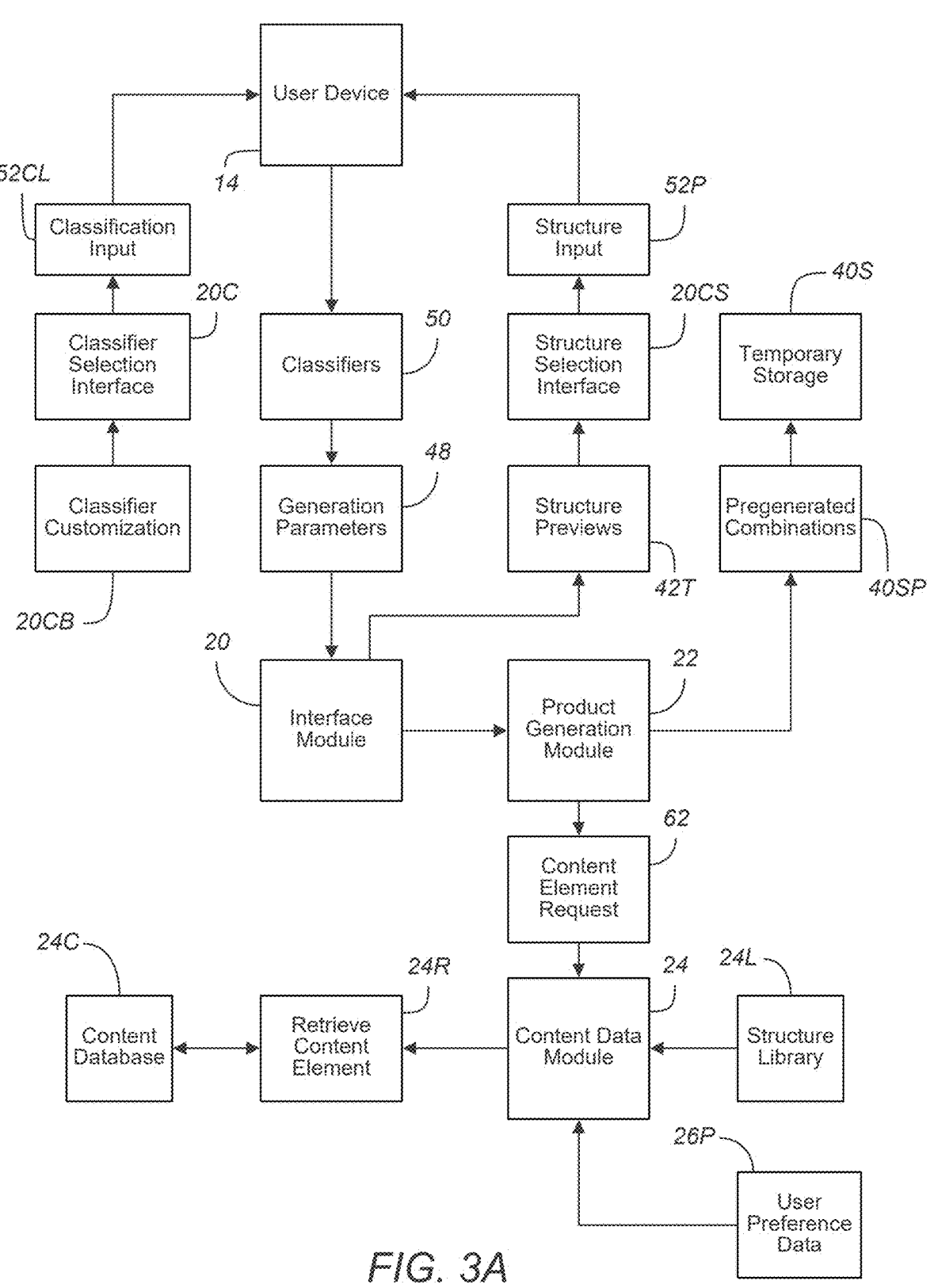
FIG. 3A is a block diagram showing the creation of generation parameters using the preview interface, resulting in the product generation module sending a content element request to the content data module, in accordance with an embodiment in the present disclosure.
Figure 3B:
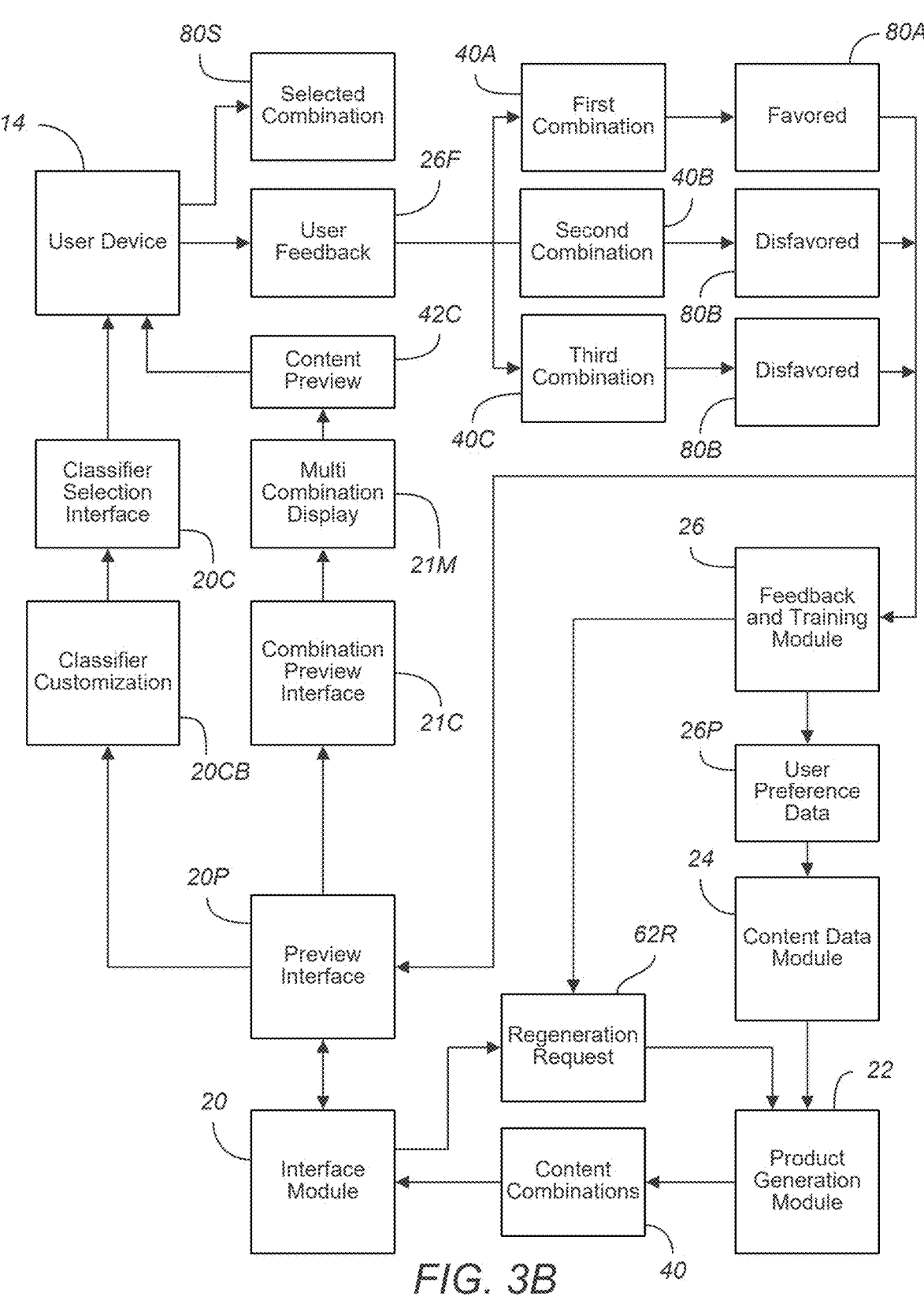
FIG. 3B is a block diagram depicting various sub-interfaces of the preview interface which assign user feedback to the content combinations, allowing combinations to be favored, disfavored, or regenerated, in accordance with an embodiment in the present disclosure.
Figure 3C:
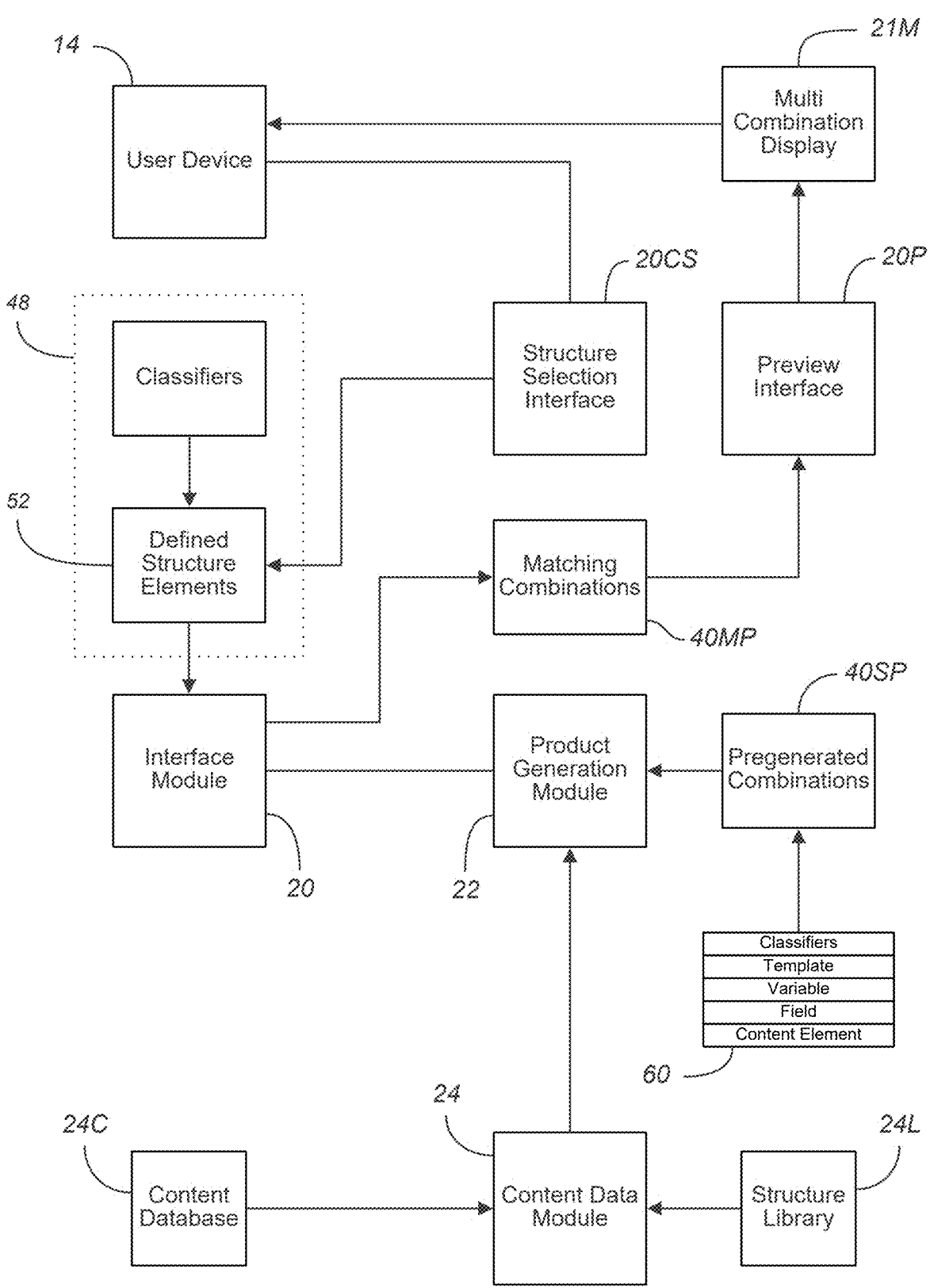
FIG. 3C is a block diagram illustrating a pregeneration process, in accordance with an embodiment in the present disclosure.
Figure 3D:
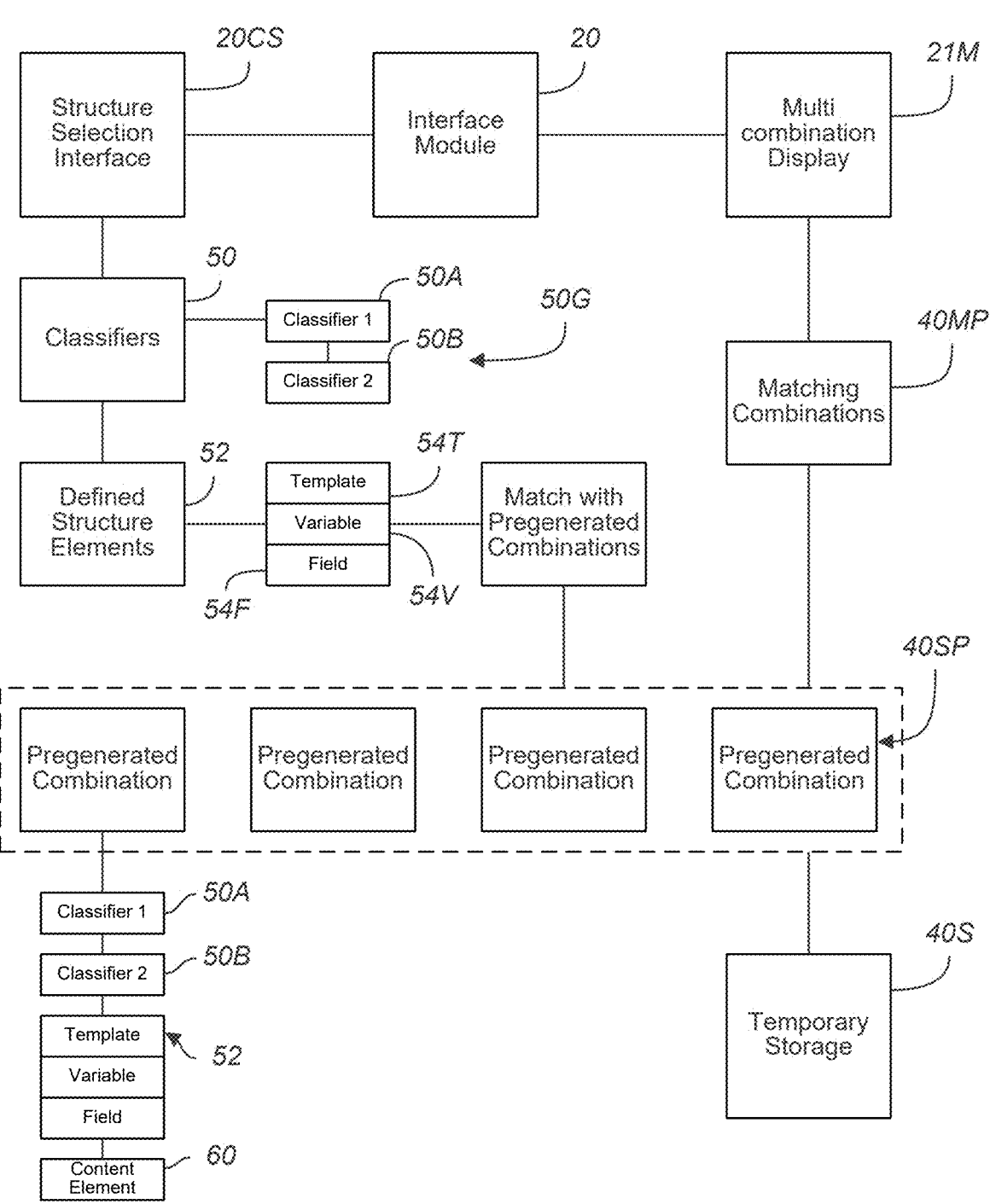
FIG. 3D is a block diagram showing pregenerated combinations being retrieved from temporary storage via a matching process, in accordance with an embodiment in the present disclosure.
Figure 3E:
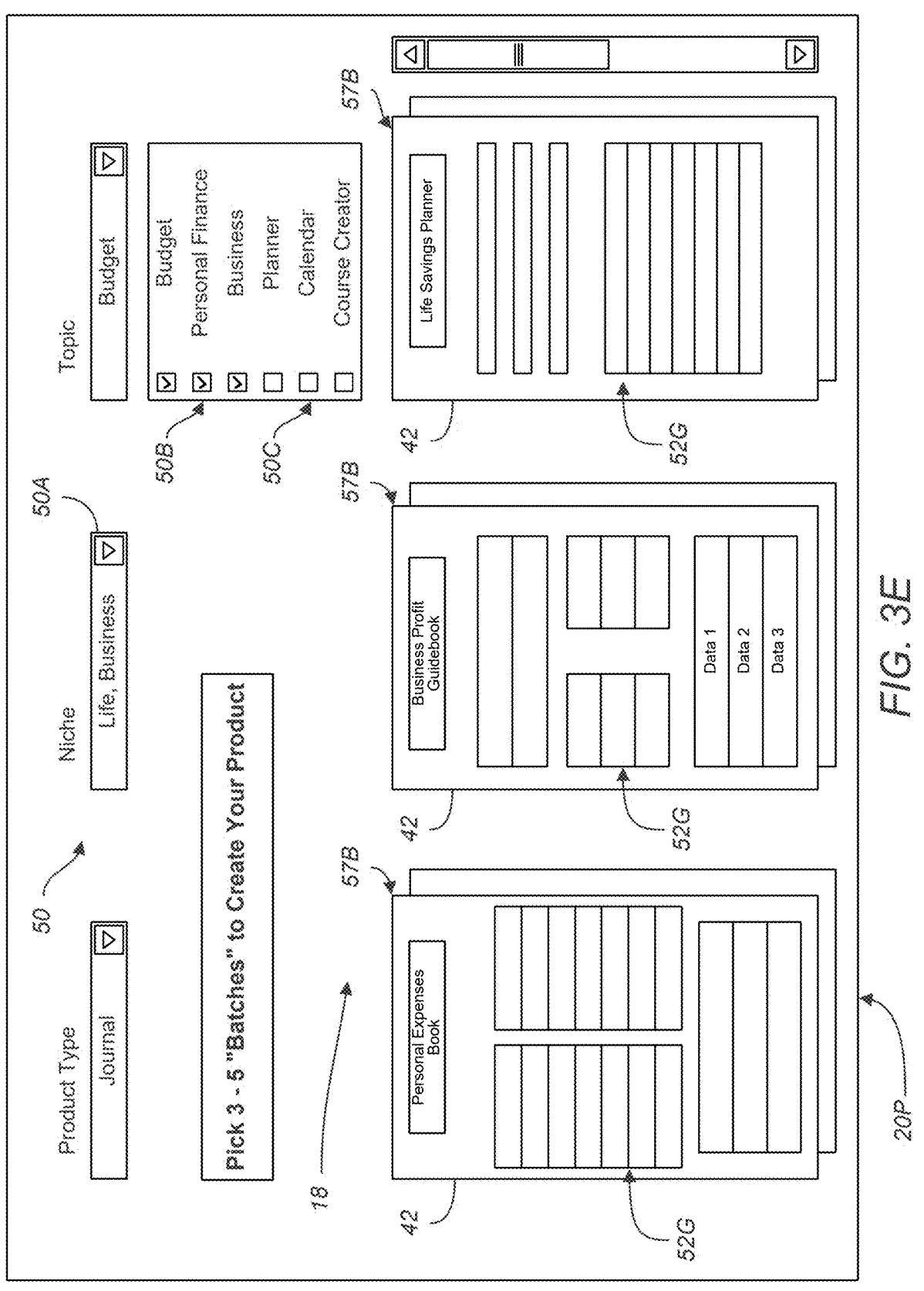
FIG. 3E is a block diagram showing an exemplary preview interface in accordance with an embodiment in the present disclosure.
Figures 3F, 3G:
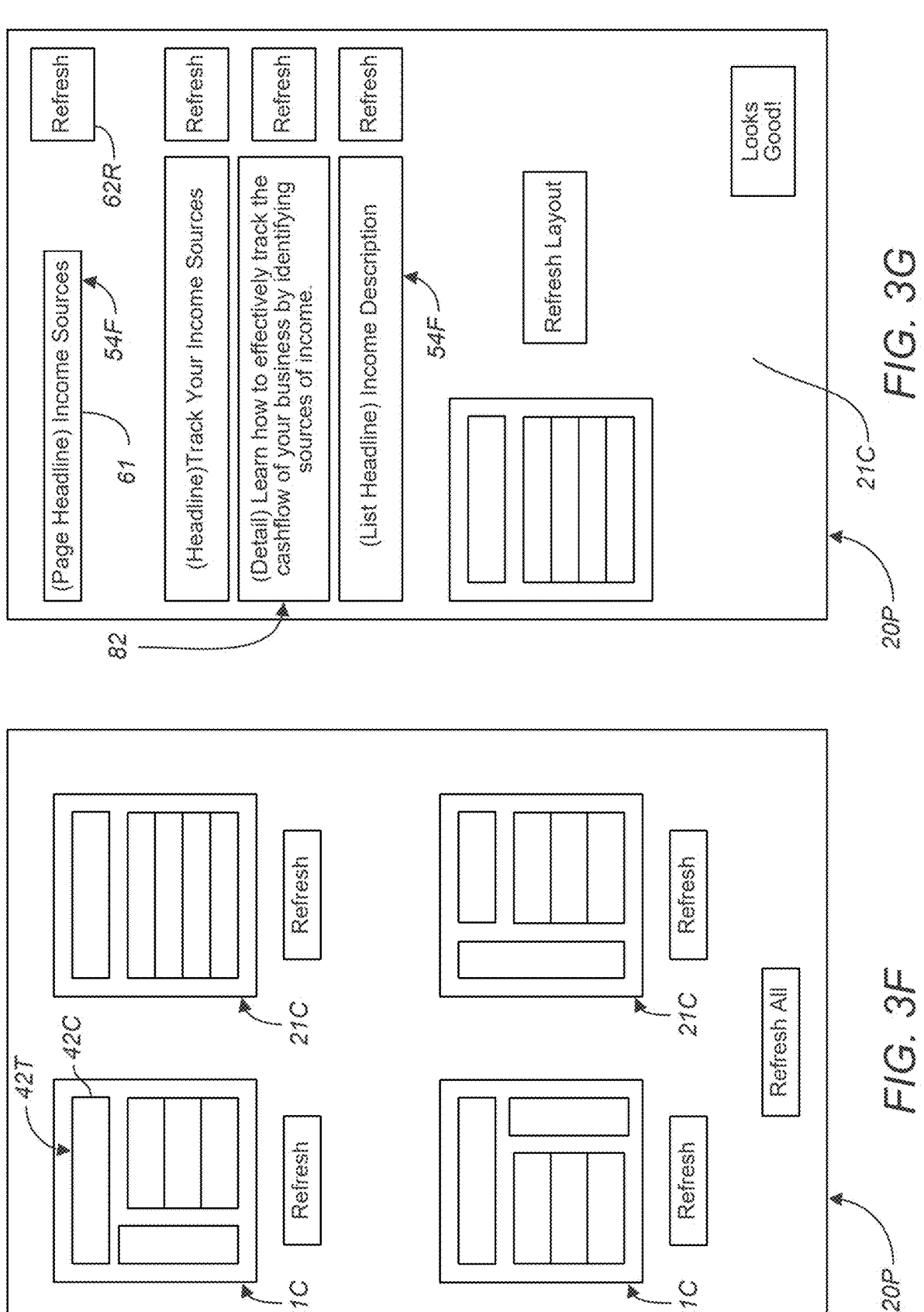
FIG. 3F is a block diagram showing a multi-combination preview display, in accordance with an embodiment in the present disclosure.
FIG. 3G is a block diagram showing a combination preview interface which allows content elements to be regenerated, in accordance with an embodiment in the present disclosure.

Turning to FIG. 3A and FIG. 3E while also referring to FIG. 1B, and FIGS. 2A-C, the functionality of the interface shall now be discussed in greater detail. The product generation module 22 will require a set of generation parameters 48 in order to build the digital product 18. In a preferred embodiment, the preview interface 20P includes a classifier selection interface 20C and a structure selection interface 20CS, which allow the user to enter user inputs corresponding to a classification input 52CL which are used to define one or more classifiers 50 or one or more structure elements 52 respectively. The classifier selection interface 20C and the structure selection interface 20CS can be implemented using various graphical user interface elements, displayed separately or in combination across one or more screens.

The preview interface 20P may also be adapted to display one or more previews 42 each forming a visual representation of a portion of the digital product 18 in completed form. In one embodiment, the preview interface 20P may generate and display a preview 42 in response to the user making user inputs which allow the generation parameters 48 to be defined. If the user adds additional classifiers 50, or changes previously defined classifiers 50, the preview interface 20P may be configured to update the previews 42 accordingly to reflect the changes to the generation parameters 48. Furthermore, in a preferred embodiment, the preview interface 20P may present each preview 42 in a reduced size, such as in the form of a thumbnail. The user may be allowed to select a preview 42 to be displayed in a detailed view, which allows the preview 42 to be expanded or zoomed in.

In one embodiment, the preview interface 20P may incorporate various graphical user interface elements such as menus or dropdown lists. The classifier selection interface 20C presents the user with one or more menus or dropdown lists which include various selection options which each embody a classifier 50. In one embodiment, the classifier selection interface 20C may allow the user to view a list of first level classifiers 50A. When the user selects a first level classifier 50A, the classifier selection interface 20C may populate the menu or dropdown list corresponding to the sub-classifiers by showing those sub-classifiers which are associated with the selected first level classifier 50A. Similarly, the classifier selection interface 20C may automatically display those second-level classifiers 50B and third level classifiers 50C which are associated with the preceding level of sub-classifier. Furthermore, the preview interface 20P may also allow the user to define one or more batches 57B which will be combined to form the digital product 18, and assign a different set of classifiers 50 to each batch 57B.

Referring to FIGS. 3A and 3E while also referring to FIG. 2A to FIG. 2E, the structure selection interface 20CS allows the user to make user inputs corresponding to a structure input 52P via the preview interface 20P which cause one or more structure elements 52 to be defined and incorporated into the generation parameters 48. In some embodiments, the structure selection interface 20CS allows the user to directly select or define the structure elements 52, such as using menus or dropdown lists. For example, the user may be allowed to select individual templates 54T or variable components 54V using the structure selection interface 20CS, which will then be incorporated by the product generation module 22 into the product layout of the digital product 18.

In a preferred embodiment, the structure elements 52 can be defined automatically based on the classifiers 50 which the user has defined or selected through any appropriate interaction with the preview interface 20P. For example, the content data module 24 may be adapted to automatically include specific structure elements 52 depending on the classifier grouping 50G. The content database 24C may associate specific sets of structure elements 52 with classifier groupings 50G based on user preference data 26P. For example, for a given classifier grouping 50G, the content data module 24 may be configured to identify sets of structure elements 52 which are highly favorable based on past user feedback 26F. These highly favorable structure elements 52 may then be used to form suggested structure sets 52G.

In one embodiment, when determining suggested structure sets 52G, the favorability of structure elements 52 in relation to the classifier grouping 50G can be determined using favorability parameters 80P. For example, the content database 24C contains data which can be used to determine which groupings of structure elements 52 are the most favorable, by identifying the content combinations 40 which have high favorability parameters 80P, and selecting the structure elements 52 included in those content combinations 40 for use as suggested structure elements 52G.

In one embodiment, once a set of classifiers 50 has been defined via the classification input 52CL, the preview interface 20P may generate and display a series of previews 42 each corresponding to a representation of the digital product 18. This allows the user to visually compare each preview 42 with the other previews 42 which are viewable within the preview interface 20P. Each preview can represent a structure preview 42T, which shows a portion of the digital product 18 embodying the product layout as determined by a grouping of structure elements 52. The preview interface 20P is therefore adapted to expose the user to many potential structural configurations which can be associated with the classifier grouping 50G, by increasing the number of structure previews 42T and suggested structure sets 52G. If the user selects one of these structure previews 42T, the structure elements 52 contained within the suggested structure set 52G embodied by the selected structure preview 42T will be selected for use in the digital product 18. Such a selection constitutes a form of structure input 52P. The user may also be provided with the option to reject any of the previews 42.

The preview interface 20P may therefore refresh the rejected preview 42 by selecting a different suggested structure set 52G.

To increase variety and breadth of user choice, the preview interface 20P may display a plurality of previews 42, with each preview 42 embodying a different suggested structure set 52G. Additionally, the preview interface 20P may also utilize suggested structure elements 52 of varying levels of favorability to increase exposure to structure elements 52 which have not been suggested as frequently. If a user approves and selects one of the previews 42, the suggested structure set 52G can be associated with favorable user feedback, and the favorability of the structure elements 52 embodied within the selected preview 42 can be increased. Conversely, if a preview 42 has been rejected, the favorability of the associated suggested structure set 52G may be reduced. Previews 42 which are neither selected nor rejected may be subject to varying favorability changes. For example, the suggested structure set 52G may receive no change in favorability if the associated preview 42 is not selected. Alternatively, the favorability of the associated suggested structure set 52G may be reduced if the frequency at which the preview 42 is presented has exceeded the frequency at which the preview 42 is selected.

Returning to FIG. 3A while also referring to FIG. 1B, FIGS. 2A-F, and FIGS. 3E-F, once the classifiers 50 and structure elements 52 have been defined via the user's interactions with the preview interface 20P, including classification inputs 52CL and structure inputs 52P, the product generation module 22 can begin the process of retrieving the content elements 60 necessary to create the digital product 18. The classifiers 50 of the classifier grouping 50G determine the scope of the information from which the content elements 60 will be drawn, while the defined structure elements 52 determine the structure and layout of the digital product 18, as well as the specific criteria which will be used to facilitate retrieval of favorable content elements 60F (see FIG. 4D) appropriate to the structure elements 52.

In one embodiment, the product generation module 22 reads the generation parameters 48 to determine the product layout of the digital product 18. The generation parameters 48 identify each structure element 52 and content field 54F which will be incorporated into the digital product 18. The product generation module 22 may then populate the product layout of the digital product 18 with the content fields 54F specified by the identified structure elements 52. The product generation module 22 is adapted to create a content element request 62 for each content field 54F within the product layout, and the content element request 62 may incorporate any of the generation parameters 48 which allow an appropriate content element 60 to be referenced from the content database 24C, as described above with regards to the organization of the content database 24C. For example, a content element request 62 for a particular content field 54F may identify the classifiers 50 associated with that field 54F, as well as the variable component 54V which contains the content field 54F. Where appropriate, content modifiers 56C can be applied at the level of the variable component 54V or the level of the content field 54F.

Referring to FIGS. 3A, 3B, and FIGS. 3F-3G while also referring to FIG. 1B, and FIGS. 2A-F, the product generation module 22 may identify each content element 60 which can be matched to the generation parameters 48 for each content field 54F, and group each of said content elements 60 into a content variation pool 60P. The product generation module 22 draws from the content variation pool 60P to select the content element 60 which will ultimately be used to populate the content field 54F.

The product generation module 22 may select one or more of the content combinations 40 within the content variation pool 60P to form one or more suggested content matches 61. Each suggested content match 61 may be used to temporarily populate the content field 54F within a combination preview interface 21C, which will be presented to the user within the preview interface 20P. The combination preview interface 21C presents the user with a variation of the preview 42, corresponding to a content preview 42C, which shows a portion of the digital product 18 which includes a content field 54F populated with a suggested content match 61 drawn from the content variation pool 60P of the content field 54F.

The suggested content match 61 may be selected from the content variation pool 60P by selecting one of the content combinations 40 with high favorability parameters 80P. To increase variation of the suggested content, the product generation module 22 may introduce a randomness factor in the selection process to potentially suggest a content combination within the content variation pool 60P with a lower frequency of user selection.

Furthermore, each preview 42 in the combination preview interface 21C may also display a plurality of content fields 54F which are associated with a commonly shared structure element 52. For example, the combination preview interface 21C may display a plurality of content fields 54F contained within one or more variable components 54V, with each content field 54F populated with a suggested content match 61. This allows the combination preview interface 21C to provide the user with a visual representation of a content combination chain 82, in which each suggested content match 61 is suggested based on the content combination chain favorability parameter 82F of the associated content combination 40. For example, the suggested content matches 61 used to populate a variable component 54V within the preview 42 may correspond to a content combination chain 82, in which the likelihood of selection for each content combination 40 is influenced by the preceding 41A content combination 40.

The preview interface 20P allows the user to submit a regeneration request 62R for any content field 54F. For example, the combination preview interface 21C may include a graphical interface element (for example, labeled "Refresh" to activate a Regeneration Request 62R) adjacent to a suggested content match 61. If said graphical interface element is activated by the user, the product generation module 22 will replace the suggested content match 61 with another content combination 40 within the content variation pool 60P, and the combination preview interface 21C will be refreshed accordingly to display the new suggested content match 61.

The combination preview interface 21C also allows the user to approve of any of the suggested content matches 61 or content combinations 40 displayed within one of the previews 42. By approving a suggest content match 61 or content combination 40 using the combination preview interface 21C, the product generation module 22 will consider such content combination 40 to be a selected combination 80S, and the content field 54F will be populated within the corresponding content element 60. The content element 60 associated with each selected combination 80S will be represented in the completed digital product 18.

In one embodiment, the preview interface 20P may allow the user to regenerate the layout of a portion of the digital product 18 without regenerating the content elements 60. For example, the product generation module 22 may alter various aesthetic attributes of the structure elements 52 associated with a given content combination 40, or may attempt to replace the structure elements 52 with other structure elements 52 with which the classifier grouping 50G and the content fields 54F are compatible.

In some embodiments, when one of the content combinations 40 associated with a content combination chain 82 is regenerated, the product generation module 22 may automatically regenerate and replace other content combinations 40 within the chain 82 as necessary. For example, if the user regenerates a preceding content combination 41A, the new content combination 40 may require the subsequent content combinations 41B to be regenerated, as the subsequent content combinations 41B may be rendered unfavorable based on the content combination chain favorability parameter 82F.

Continuing with the present example, a subsequent content combination 41B may represent a content element 60 which embodies an idea which logically follows the preceding content combination 41A, when the preceding content combination 41A contains a first content element 60. The first content element 60 may contain the phrase "Income Sources", while the subsequent content combination 41B may contain the text phrase "Track Your Income Sources". However, if the first content element 60 is replaced by a new content combination 40 containing the phrase "Business Expenditures," the phrase "Track Your Income Sources" will no longer logically follow. Therefore, the product generation module 22 may identify a new suggested content match 61 which has a higher content combination chain favorability parameter 82F in relation to the new first content element 60. To conclude the current example, the product generation module 22 may then identify a content combination 40 in the content variation pool 60P containing a content element 60 which is highly favorable relative to the first content combination 60, such as the phrase "Track Your Business's Top Expenditures".

In a preferred embodiment, each regeneration request 62R or approval directed at a content combination 40 or suggested content match 61 counts as favorability data 80, and will be analyzed by the feedback and training module 26 to improve the user preference data 26P. The favorability parameters 80P of each content combination 40 will be adjusted accordingly, depending on whether the content combination 40 is designated as favored 80A or disfavored 80B. Where the content combination 40 or suggested content match 61 is part of a content combination chain 82, the favorability of each content combination 40 will be analyzed and updated based on the composition of the content combination chain 82.

In one embodiment, the preview interface 20P may also be adapted to display a multicombination display 21M. A multicombination display 21M corresponds to a variation of the combination preview interface 20P, in which a plurality of suggested content matches 61 for a single content field 54F are displayed in a manner which allows the user to visually compare the suggested content matches 61. As such, each of the plurality of suggested content matches 61 may be embodied within a preview 42 or content preview 42C which provides a visual representation for each suggested content match 61. In one illustrative example, the multi-combination display 21M may simultaneously display four separate previews 42, with each preview 42 displaying a different suggested content match 61 for the same content field 54F. The multicombination display 21M allows the user to submit a regeneration request 62R (by way of a "Refresh" button, for example) for one or more of the suggested content matches 61 within the plurality of suggested content matches 61. The user may then approve of one of the suggested content matches 61 after having viewed and compared the plurality of suggested content matches 61. A content combination 40 which is displayed as a suggested content match 61 may be recorded as being disfavored 80B if regenerated, or marked as favored 80A if approved as the selected combination 80S. Similarly, if a suggested content match 61 is neither regenerated or approved, the corresponding content combination 40 may be considered disfavored 80B.

Furthermore, in some embodiments, the multicombination preview interface 21M may also be adapted to simultaneously compare suggested content matches 61 for a plurality of content combination chains 82 which are all associated with the same content fields 54F. This effectively allows the user to review and submit favorability data 80 for multiple variations of one content combination chain 82. As with the combination preview interface 21C, the user is allowed to regenerate any of the suggested content matches 61 within each content combination chain 82. The feedback and training module 26 will update the content combination chain favorability parameter 82F for each suggested content match 61 thus presented.

In a preferred embodiment, the interface module 20 will continue to present the user with requests for user feedback until every content field 54F within the product layout of the digital product 18 has been populated. The interface module 20 may utilize variations of the combination preview interface 21C and multicombination display 21M to display any combination of structure elements 52. For example, the preview interface 20P and its sub-interfaces may allow the user to approve or reject all the content combinations 40 associated with a group of content fields 54F at the level of a variable component 54V, the level of a template 54T, or the level of a batch 57B. For example, a first combination 40A may be favored 80A, while a second combination 40B and a third combination 40C may be disfavored 80B (see FIG. 3B).

Turning now to FIG. 3C and FIG. 3D while also referring to FIGS. 3A-B, FIG. 3E, and FIGS. 1A-B, the digital content generation platform 10 may be adapted to streamline the retrieval and regeneration of content elements 60 through the use of pregenerated combinations 40SP. The amount of data which is held within the content database 24C may potentially be quite large. As a result, when content element requests 62 or regeneration requests 62R are made by the product generation module 22, there may be a delay between the time the request is generated and the time the content data module 24 identifies and retrieves (see FIG. 3A, Retrieve Content Element 24R) content elements 60 from the content database 24C. Such delays also apply to the generation of previews 42 within the variations of the preview interface 20P, especially where the user is presented with a plurality of previews 42 for simultaneous or concurrent visual comparison.

As a result, in one embodiment, the content data module 24 and the product generation module 22 are adapted to begin retrieving content elements 60 to populate a plurality of pregenerated combinations 40SP when the classifiers 50 are defined via a classification input 52CL, but before the structure input 52P is entered and the structure elements 52 within the generation parameters are defined. For example, once the user has entered a classification input 52CL which defines one classifier 50, such as a first-level classifier 50A, the product generation module 22 may immediately begin to create the pregenerated combinations 40SP. Each of the pregenerated combinations 40SP can be stored within a temporary storage 40S maintained by the control server 12, or a separate computing device in communication with the control server 12 and under its direction. As each classifier 50 is defined, the content data module 24 may identify each content element 60 which can be associated with said classifier 50.

Initially, the scope of such information will be broad, such as when a first level classifier 50A is selected. The product generation module 22 may therefore create a pregenerated combination 40SP for each content element 60 which can be associated with the defined first level classifier 50. However, as additional sub-classifiers are added to the classifier grouping 50G, the potential scope of information is narrowed as the sub-classifiers within the classifier grouping 50G will reduce the quantity of associated content elements 60. In a preferred embodiment, the retrieval of the pregenerated combinations 40SP may begin once the user begins interacting with the classifier selection interface 20C. By preparing a set of pregenerated combinations 40SP which constitute a small fraction of the data within the content database 24C, the time needed to complete database queries is greatly reduced.

In addition, each pregenerated combination 40SP may also reflect the various structure elements 52 which can be associated with the classifier grouping 50G. As such, the product generation module 22 may identify the structure elements 52 or groupings thereof which can be associated with one or more of the classifiers 50 within the classifier grouping 50G. Therefore, a pregenerated combination 40SP may incorporate a suggested structure set 52G, in combination with a content element 60. If given sufficient time to perform the pregeneration process, the product generation module 22 and the content data module 24 may be able to identify every content field 54F within the structure elements 52 which can be associated with the classifier grouping 50G, as well as every content element 60 which can be used to populate each content field 54F.

As the user interacts with the structure selection interface 20CS, the quantity of the content combinations 40 reflected in the pregenerated combinations 40SP may be further reduced in quantity once the structure elements 52 which will be incorporated into the digital product 18 are defined. Therefore, the pregenerated combinations 40SP may exclude any content elements 60 which are not associated with the identified content fields 54F or other structure elements 52.

Continuing to refer to FIG. 3C and FIG. 3D while also referring to FIGS. 3A-B, FIG. 3E, FIG. 1B, FIG. 2A and FIG. 2D, once the generation parameters 48 of the digital product 18 have been fully defined and the product layout of the digital product 18 has been populated with the appropriate content fields 54F, the product generation module 22 will begin retrieving content elements 60 via content element requests 62 or regeneration requests 62R. In one embodiment, the product generation module 22 will first attempt to retrieve the relevant content elements 60 from amongst the pregenerated combinations 40SP by first identifying matching combinations 40MP which correspond to the content element request 62 or regeneration request 62R. This can be achieved by comparing the classifiers 50 and defined structure elements 52 of the generation parameters 48 of a content field 54F, with the classifiers 50 and structure elements 52 associated with each pregenerated combination 40SP. The matching combinations 40MP can then be utilized to form the content combinations 40 and the content variation pools 60P for each content field 54F which must be populated to complete the digital product 18.

In some embodiments, the product generation module 22 may prepare reduced size renderings of portions of the digital product 18 to accompany the pregenerated combinations 40SP. Such renderings can be created as static thumbnail images which can be rapidly retrieved to populate previews 42 within the preview interface 20P or the sub-interfaces thereof.

Returning to FIG. 1B while also referring to FIGS. 4A-B, FIG. 2D and FIG. 3A, we now turn to the distinction between unvalidated content 60U and validated content 60V. Unvalidated content 60U corresponds to content elements 60 produced by the generative AI application 74, for which insufficient user feedback data exists to establish that the unvalidated content 60U meets a minimum standard of favorability. Favorability corresponds to the probability that a user will approve of the content element 60 when the content element 60 is suggested to populate a given content field 54F. Favorability considers both the relevance of the content element 60 to the content field 54F to be populated, as well as the quality of the content element 60 itself. Poor grammar, incorrect facts, or other undesirable factors will negatively influence the quality of a content element 60. Conversely, validated content 60V corresponds to content elements 60 which are maintained within the content database 24C and which are associated with sufficient user preference data 26P to meet a positive threshold 84P.

The classifier selection interface 20C is adapted to allow the user to input or otherwise define a new unvalidated classifier 50UV via a classifier customization function 20CB. For example, the user may be prompted to input a word, phrase, or sentence which describes a subject or theme using natural language. This input may then be added to the content database 24C as a new unvalidated classifier 50UV. In some embodiments, the classifier customization function 20CB may allow the user to designate the unvalidated classifier 50UV as a first level classifier 50A or a sub-classifier to another classifier 50 within the classifier grouping 50G.

When an unvalidated classifier 50UV is included in the generation parameters 48, the validated content 60V may be unable to provide sufficient content elements 60 in response to a content element request 62. Therefore, to address the content deficiency, the digital content generation platform 10 is adapted to generate new unvalidated content 60U via the generative AI application 74.

Figure 4A:
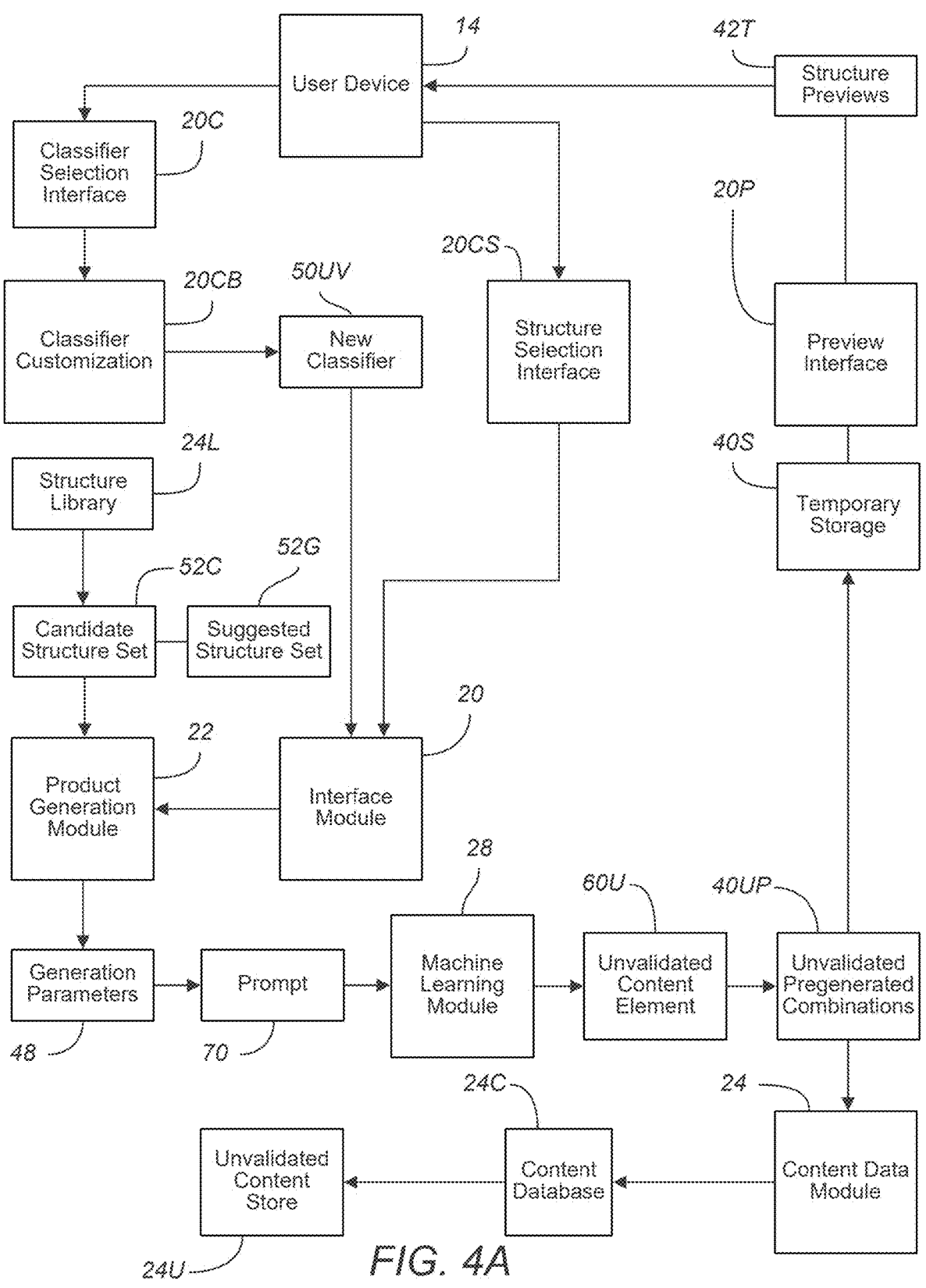
FIG. 4A is a block diagram depicting the product generation module instructing the machine learning module to generate unvalidated content for a new classifier which lacks existing content elements, in accordance with an embodiment in the present disclosure.
Figure 4B:
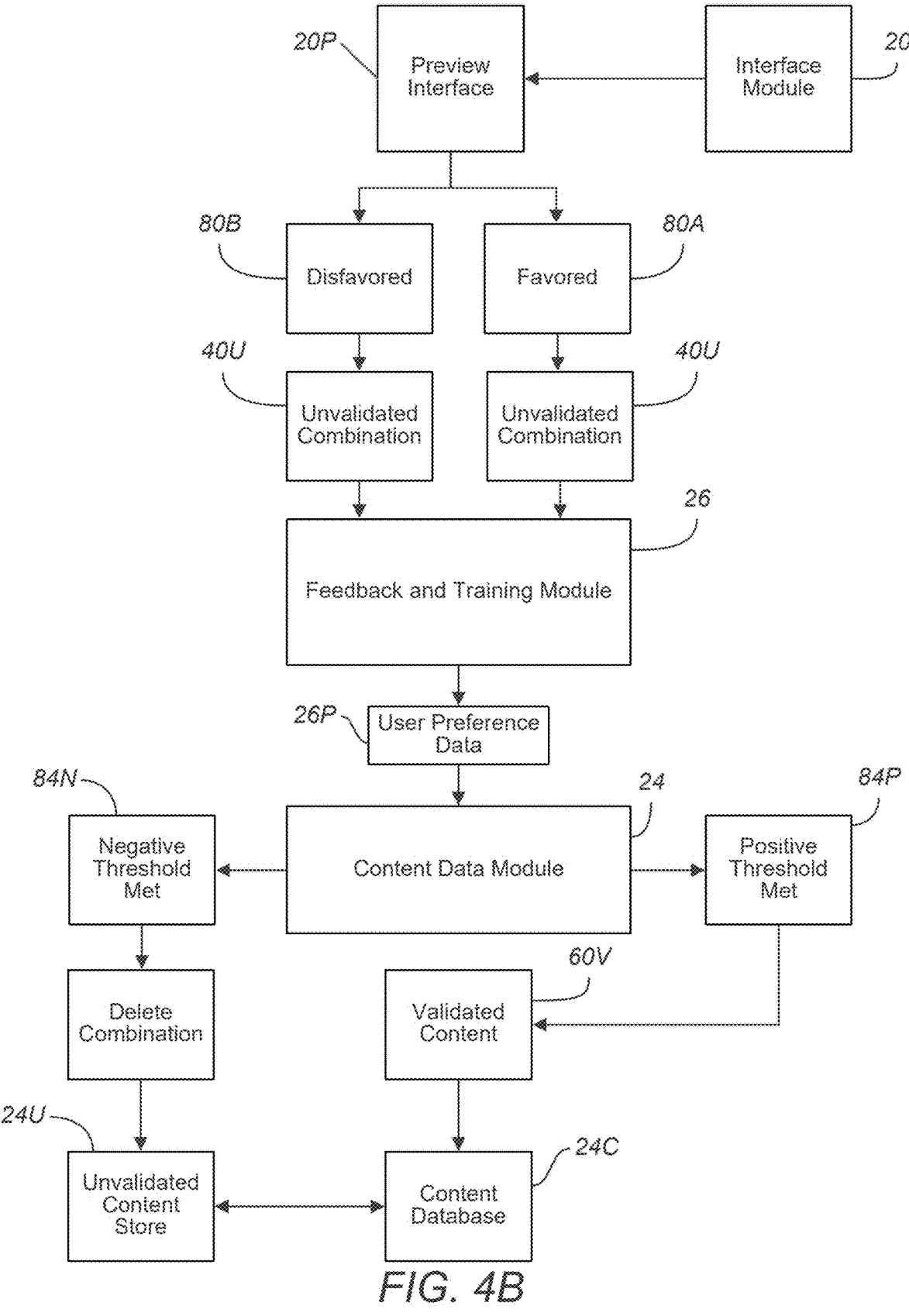
FIG. 4B is a block diagram depicting a process by which unvalidated content is assessed for suitability based on user feedback, in accordance with an embodiment in the present disclosure.
Figure 4C:
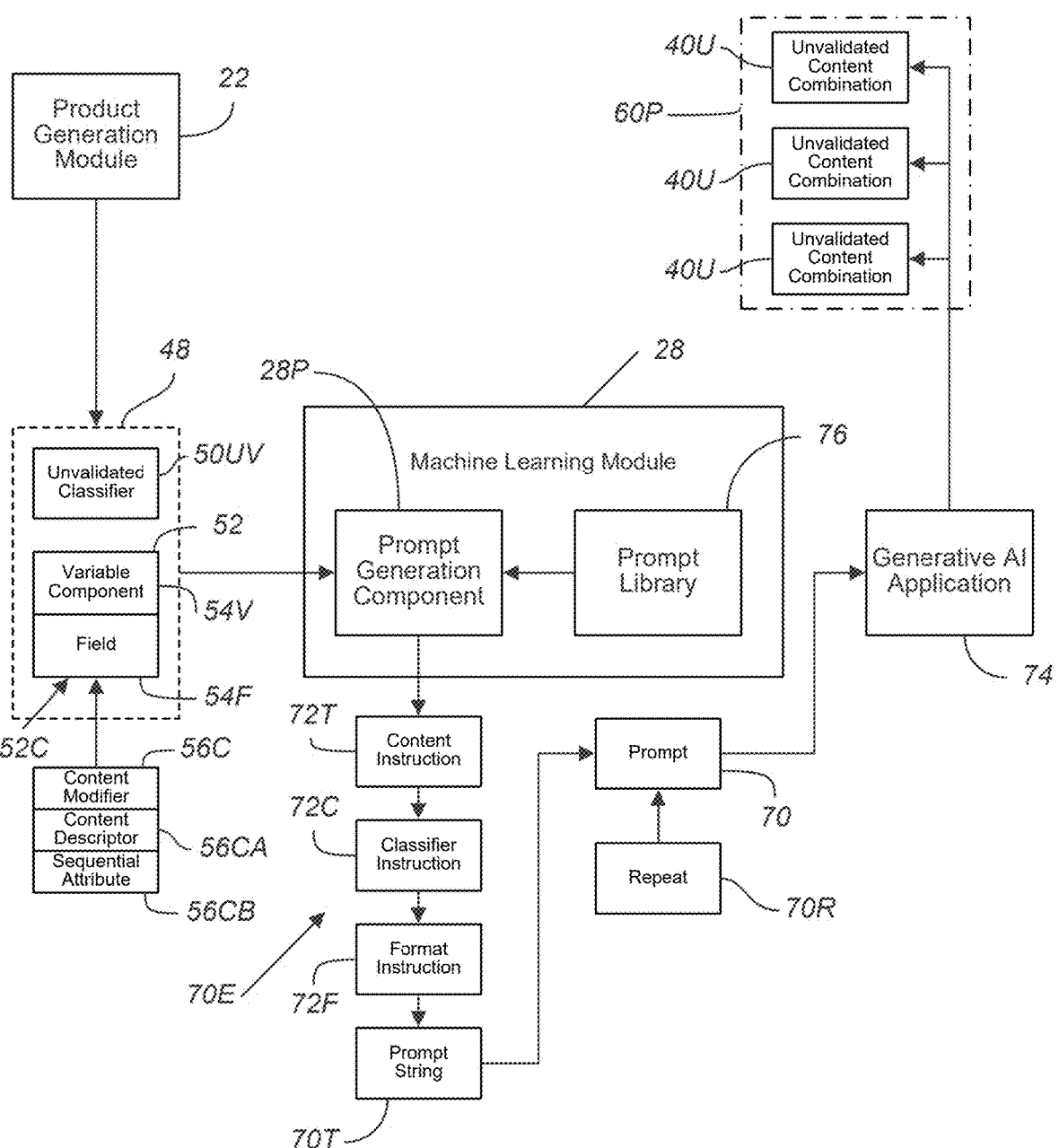
FIG. 4C is a block diagram depicting the machine learning module generating prompts which instruct the generative AI application to produce new unvalidated content, in accordance with an embodiment in the present disclosure.

Turning to FIG. 4C while also referring to FIG. 4A, FIG. 1B, and FIGS. 2C-D, in one embodiment, the machine learning module 28 has a prompt generation component 28P and a prompt library 76. The prompt generation component 28P is configured to interpret the generation parameters 48 of a content element request 62 and generate a prompt 70, which can then be submitted to the generative AI application 74. The prompt library 76 may contain various instructions, code sequences, or commands which are interpretable by the generative AI application 74.

In one embodiment, the structure elements 52 to be associated with a classifier grouping 50G containing an unvalidated classifier 50UV may be selected or defined using the structure selection interface 20CS. The classifier grouping 50G may contain other classifiers 50 in addition to the unvalidated classifier 50UV. The product generation module 22 may therefore identify structure elements 52 which are associated with one of the other classifiers 50 within the classifier grouping 50G other than the unvalidated classifier 50UV, and utilize these structure elements 52 as suggested structure sets 52G. Alternatively, where the new unvalidated classifier 50UV lacks any existing favorability data with regards to the structure elements 52 and no favorable suggested structure sets 52G can be identified, the product generation module 22 may employ other selection criteria to identify structure elements 52 that can be used as candidate structure sets 52C. Candidate structure sets 52C can be selected speculatively or via "best guess". For example, the product generation module 22 may utilize the user preference data 26P to identify structure elements 52 which are most favorable with a broad range of different classifiers 50.

The preview interface 20P may present the user with a plurality of structure previews 42T each showing one of the candidate structure sets 52C. This allows the user to visually compare each of the candidate structure sets 52C in order to make a structure input. The preview interface 20P may therefore allow the user to approve or refresh any of the candidate structure sets 52C by interacting with the corresponding structure preview 42T.

Once the generation parameters 48 have been defined and the content fields 54F to be populated have been identified within the product layout of the digital product 18, the prompt generation component 28P will then generate a series of content element requests 62 directed to the machine learning module 28.

Figure 4D:
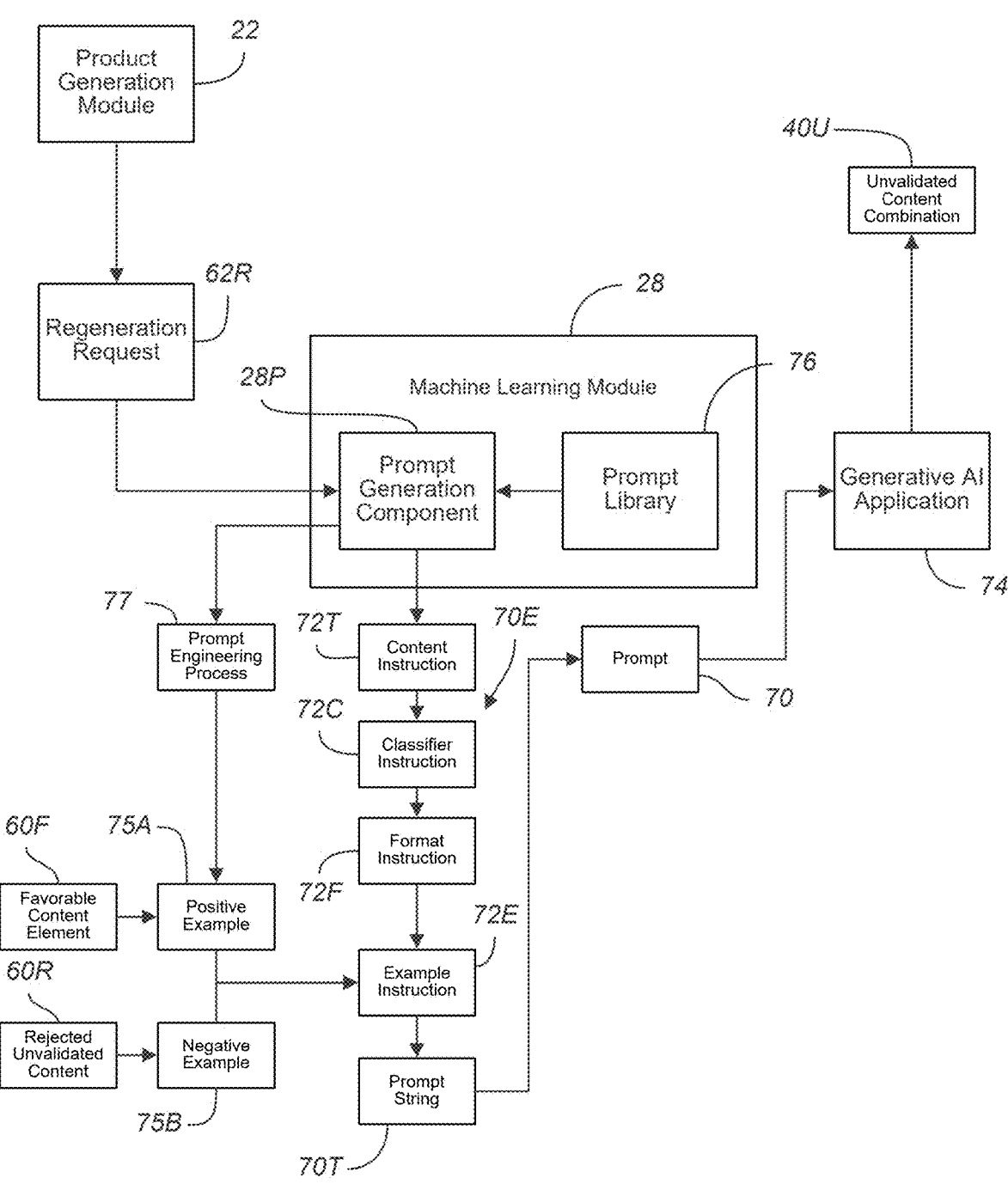
FIG. 4D is a block diagram showing the machine learning module carrying out a prompt engineering process, in accordance with an embodiment in the present disclosure.

In one embodiment, the prompt 70 can be formed by combining multiple prompt elements 70E into a prompt string 70T (see FIGS. 4C and 4D). To facilitate prompt generation, each classifier 50 and each structure element 52 may be associated with a prompt element 70E. The prompt element 70E may be a string segment configured to convey essential information describing the classifier 50 or structure element 52 to the generative AI application. Therefore, the prompt element 70E of a classifier 50 may correspond to a classifier instruction 72C which conveys the theme, concept, or subject which the classifier embodies. Similarly, the prompt element 70E of a structure element 52 may correspond to a content instruction 72T which narrows the scope of information represented by a classifier 50 when the structure element 52 is combined with the classifier 50. For example, the prompt element 70E associated with a variable component 54V and the content fields 54F contained within the variable component 54V may convey information which describes the content modifier 56C, content descriptor 56CA, or sequential attributes 56CB which are associated with the variable component 54V or the content field 54F. Additionally, a structure element 52 may also be associated with a format instruction 72F which describes how the output of the generative AI application 74 should be organized.

When the machine learning module 28 receives a content element request 62, the prompt generation component 28P may retrieve the prompt elements 70E linked to each of the classifiers 50 and structure elements 52 within the generation parameters 48, and incorporate the prompt elements 70E into an instruction or command which is properly configured to facilitate interpretation by the generative AI application 74. In one example, the generation parameters 48 may identify a variable component 54V and an unvalidated classifier 50UV. In the present example, the prompt element 70E of the unvalidated classifier 50UV may correspond to the text segment "Italian luxury cars of the 1920s", entered by the user to define the unvalidated classifier 50UV. The prompt element 70E of the variable component 54V corresponds to a content instruction 72T which indicates that the content fields 54F of the variable component 54V should contain a ranked list of important facts regarding the subject described by a classifier 50. The variable component 54V may also be associated with a format instruction 72F. The constructed prompt 70 which combines the prompt elements 70E may therefore correspond to the text segment "Construct a ranked list of important facts regarding the subject. The subject is Italian luxury cars of the 1920s. The ranked list must have ten facts, and the facts must be arranged in descending order of importance."

Once the generative AI application 74 receives the prompt 70, it proceeds to generate an output in accordance with the instructions contained with the prompt 70. In one embodiment, the outputted content may be used to form unvalidated content combinations 40U associated with the unvalidated content elements 60U. Furthermore, the prompt generation component 28P may be configured to repeat 70R each prompt 70 (see FIG. 4C) in order to generate enough unvalidated content combinations 40U to form a content variation pool 60P for each content field 54F which is to be populated.

Turning to FIG. 4B while also referring to FIG. 4A, FIG. 1B, FIG. 2A, FIGS. 2D-E, and FIG. 3A, the unvalidated content combinations 40U may be held in temporary storage 40S pending user feedback 26F. The new unvalidated classifier 50UV may also be stored within the unvalidated content store 24U, thus allowing the same unvalidated classifier 50UV to be referenced by one of the users in a subsequent classification input 52CL. In one embodiment, unvalidated content combinations 40U which are approved by the user via the preview interface 20P may be transferred to a portion of the content database 24C forming an unvalidated content store 24U. Alternatively, each of the unvalidated content elements 40U can be stored within the unvalidated content store 24U.

The unvalidated content combinations 40U within the unvalidated content store 24U may each be assigned a favorability parameter 80P. The favorability parameter 80P can be used to track a favorability score for determining whether the unvalidated content combination 40U has met or exceeded the positive threshold 84P or the negative threshold 84N. In one embodiment, the favorability score for each unvalidated content combination 40U may be increased for each favored designation 80A, or decreased for each unfavored designation 80B. If the favorability score has met the positive threshold 84P, the content element 60 associated with the unvalidated content combination 40U may be designated as validated content 60V and will be included in the content database 24C. Conversely, if the favorability score is reduced to below the negative threshold 84N, the unvalidated content combination 40U may instead be deleted from the unvalidated content store 24U, and will no longer be available to form a suggested content match. Furthermore, the unvalidated classifier 50UV may be converted to a standard classifier 50 once a sufficient proportion of the unvalidated content elements 60U associated with the unvalidated classifier 50UV have been converted to validated content 60V through user feedback.

Turning to FIG. 4D while also referring to FIG. 4A, FIG. 1B, FIG. 2A, and FIGS. 2D-E, the machine learning module 28 is adapted to apply prompt engineering techniques in a prompt engineering process 77 to improve the favorability of unvalidated content 60U produced by the generative AI application 74. In one embodiment, the prompt generation component 28P may be configured to introduce labeled examples to increase the favorability of content elements produced by the generative AI application 74, by instructing the generative AI application 74 to follow a positive example 75A, and avoid a negative example 75B. Positive examples 75A and negative examples 75B can be incorporated into the prompt 70 via an example instruction 72E from prompt element 70E. In one embodiment, the user preference data 26P can be leveraged to supply positive examples 75A or negative examples 75B. Content elements 60 which are highly favorable (for example, Favorable Content Element 60F) may be used to provide positive examples 75A, while content elements 60 which are unfavorable (for example, Rejected Unvalidated Content 60R) may be stored and used to provide negative examples 75B (see FIG. 4D). In addition, in some embodiments, user feedback 26F may be used to populate datasets in the form of machine learning data 26M, which can be used to fine-tune the capabilities of the generative AI application 74.

Furthermore, the example instructions 72E can be selected based on relevance to the content field 54F which is to be populated. For example, when generating a content element 60 for a given variable component 54V or other structure element 52 using an unvalidated classifier 50UV, the prompt generation component 28P may identify a content element 60 previously generated to populate the same variable component 54V or structure element 52 under a different classifier 50. Where the classifier grouping 50G contains other classifiers 50 in addition to the unvalidated classifier 50UV, the example instruction 72E may utilize a content element 60 which can be used to populate the content field 54F under one of the other classifiers 50. In this example, even though the prompt 70 used to generate the positive example 75A may have included a different classifier instruction 72C embodying a different classifier 50, the classifier instructions 72C and format instructions 72F may remain the same.

Referring to FIGS. 4A-C, FIGS. 3A-B, FIG. 3D, FIG. 3F, FIG. 2A, and FIG. 1B, in an embodiment, the digital product generation platform 10 may be adapted to produce a plurality of unvalidated pregenerated combinations 40UP, in a manner similar to the pregenerated combinations 40SP shown in FIG. 3D. The product generation module 22 may begin the process of retrieving the unvalidated pregenerated combinations 40UP immediately following the entry of a classification input 52CL by one of the users which defines a new unvalidated classifier 50UV. Pregeneration of unvalidated content elements 60U serves to mitigate delays incurred while the generative AI application 74 processes a request to generate new content.

Prior to the definition of a structure input 52P, the product generation module 22 may identify a plurality of candidate structure sets 52C, and identify the content fields 54F of each of the identified candidate structure sets 52C. The product generation module 22 will then submit a content element request 62 to the machine learning module 28 for unvalidated content elements 60U to create the content variation pool 60P for each of the identified content fields 54F. Each of the unvalidated content elements 60U will be associated with the corresponding structure elements 52 and will be stored as an unvalidated pregenerated combination 40UP within the temporary storage 40S.

In a preferred embodiment, this process utilizes the time delay which occurs between the entry of the classification input 52CL and the entry of the structure input 52P in order to prepopulate the content variation pools 60P with unvalidated content 60U produced by the generative AI application 74. The preview interface 20P may present the user with a plurality of structure previews 42T embodying each of the candidate structure sets 52C, and the pregeneration process continues while the user views the structure previews 42T prior to defining the structure input 52P.

After the user has defined a structure input 52P and selected the structure elements 52 which will be used to define the content fields 54F used to populate the product layout, the preview interface 20P may immediately start retrieving the appropriate unvalidated pregenerated combinations 40UP associated with the defined content fields 54F. The unvalidated content elements 60U within each unvalidated pregenerated combination 40UP can be retrieved from the temporary storage 40S to populate or refresh a content preview 42C without the delay ordinarily incurred while waiting for the generative AI application 74 to generate new unvalidated content element 60U.

Once the generation of the digital product 18 is complete, the temporary storage 40S can be cleared of the unvalidated pregenerated combinations 40UP. Furthermore, any unvalidated pregenerated combinations 40UP not associated with the structure elements 52 selected as a result of the structure input 52P, may be immediately removed from the temporary storage 40S once the structure input 52P is entered.

Referring to FIG. 1A and FIG. 2A, the completed digital product 18 can be outputted in the form of a graphics file, such as a PDF file, or any other graphics file format. The graphics file embodies all the content elements 60 and the product layout, and may be saved or exported to one of the user devices 14. In certain embodiments, the digital product 18 may alternatively be generated as a web page. The product generation module 22 may therefore be adapted to embody the product layout and content elements 60 in the form of an HTML file.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. Other types of languages include XML, XBRL and HTML5. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present disclosure. In this regard, each block in the flowchart or block diagrams may represent a module; segment or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flow diagrams depicted herein are just one example. There may be many variations to this diagram or the steps (or operations) described therein without departing from the spirit of the disclosure. For instance, the steps may be performed in a differing order and/or steps may be added, deleted and/or modified. All of these variations are considered a part of the claimed disclosure.

In conclusion, herein is presented a digital content generation platform. The disclosure is illustrated by example in the drawing figures, and throughout the written description. It should be understood that numerous variations are possible, while adhering to the inventive concept. Such variations are contemplated as being a part of the present disclosure.

What is claimed is:

1. A digital content generation platform comprising:

a control server comprising one or more processors, an interface module controlling a preview interface for display on user devices, a product generation module, a feedback and training module, a content data module, and a computer storage device upon which is stored at least a structure library, user preference data from a plurality of users, a content database, and non-transitory computer-readable media comprising computer-executable instructions that, when executed by the one or more processors, cause the digital content generation platform to:

communicate, by the control server, with the user devices of the plurality of users;

receive and associate, by the preview interface, a desired digital product type, a classification input identifying one or more classifiers from the content database, and a structure input identifying at least one structure set comprising structure elements from the structure library, wherein the structure input specifies an initial product layout of the desired digital product type, and each structure element comprises one or more content fields defined by the one or more classifiers within the initial product layout;

match, by the content data module, the one or more content fields identified by the structure input to a plurality of content elements in the content database, and create a content variation pool from the matched one or more content fields and the plurality of content elements;

assign, by the content data module, a favorability parameter to the content variation pool by aggregating and analyzing the user preference data comprising user feedback about individual content fields used for populating individual content elements in previous product layouts, and store the favorability parameter in the content database;

render, by the product generation module, a draft product layout, wherein to render the draft product layout, the execution of the computer-executable instructions by the one or more processors further causes the product generation module to:

retrieve the matched one or more content fields and the plurality of content elements from the content variation pool in the content database, and populate the draft product layout with the matched one or more content fields and the plurality of content elements within the structure elements defined by the structure input;

cause the interface module to display on the preview interface a content preview for each content field within the draft product layout, wherein the product generation module renders an associated content field populated with an associated content element of the content variation pool; and upon receipt, by the product generation module, of a refresh instruction, cause the interface module to display on the preview interface a refreshed content preview, wherein the product generation module re-renders the draft product layout by populating the content preview with a different content element selected from the content variation pool, and wherein the product generation module selects the different content element from the content variation pool by comparing the favorability parameters of each of the content elements within the content variation pool;

update, by the feedback and training module, the favorability parameter of each of the content elements by increasing the favorability parameter when a corresponding content preview is approved, or by decreasing the favorability parameter when the corresponding content preview is refreshed; and render, by the product generation module, a final product layout upon receipt, from the preview interface, of a user approval of one or more of the content previews by populating each of the content fields with a content element associated with the corresponding approved content preview, thereby creating a completed digital product.

2. The digital content generation platform of claim 1, wherein the computer-executable instructions, when executed by the one or more processors, further cause the digital content generation platform to:

present, by the preview interface to the user, a plurality of structure previews, each of the structure previews showing the draft product layout incorporating the structure elements of one of the structure sets associated with the one or more classifiers defined by the classification input;

receive, by the preview interface, a user selection of one of the structure previews, causing the structure input to define the structure set associated with the selected structure preview, wherein each of the structure sets has a favorability parameter relative to the classifiers with which the structure set is associated;

adjust, by the feedback and training module, the favorability parameter of each of the structure sets by increasing the favorability parameter when the corresponding structure preview is selected; and select, by the product generation module, the structure set to populate each structure preview by comparing the favorability parameters of each of the structure sets associated with the one or more classifiers defined by the classification input.

3. The digital content generation platform of claim 2, wherein the computer-executable instructions, when executed by the one or more processors, further cause the digital content generation platform to:

display, by the preview interface, a multi-combination preview associated with one of the content fields within the draft product layout, the multi-combination preview providing a simultaneous visual comparison of at least two of the content elements within the content variation field of the content field, each of the content previews within the multi-combination preview showing the content field populated with a different one of the content elements of the content variation pool.

4. The digital content generation platform of claim 2, wherein the computer-executable instructions, when executed by the one or more processors, further cause the digital content generation platform to:

order, by the product generation module, the content fields associated with one of the structure elements within the draft product layout in a sequence and link the content fields to a content combination chain, wherein each of the content elements associated with the content combination chain has a content combination chain favorability parameter, the content combination chain favorability parameter indicating how favorable the content element is relative to the content elements of the content variation fields of the other content fields which precede or follow the content element within the content combination chain; and populate, by the product generation module, the content previews for each of the content fields associated with the content combination chain by selecting the content elements to maximize the content combination chain favorability parameters thereof.

5. The digital content generation platform of claim 4, wherein the computer-executable instructions, when executed by the one or more processors, further cause the digital content generation platform to:

regenerate, by the product generation module, at least one of the content previews of one of the content fields associated with the content combination chain when the content preview of the content field preceding the content preview in the sequence is regenerated.

6. The digital content generation platform of claim 2, wherein the computer-executable instructions, when executed by the one or more processors, further cause the digital content generation platform to:

prior to the user entering the structure input, identify, by the product generation module, potential structure sets associated with the one or more classifiers defined by the classification input;

identify, by the product generation module, the content fields associated with each of the structure elements of the potential structure sets;

retrieve, by the product generation module, the content elements which form the content variation pool of each of the identified content fields;

store, by the product generation module to the computer storage device, the content elements as pregenerated combinations for each of the identified content fields, wherein the pregenerated combinations are stored within a temporary storage of the computer storage device; and retrieve, by the preview interface, a corresponding pregenerated combination from the temporary storage when populating, by the product generation module, the content previews of the content fields within the draft product layout.

7. The digital content generation platform of claim 2, wherein:

the control server further comprises a machine learning module having a generative artificial intelligence (GAI) application, wherein the computer-executable instructions, when executed by the one or more processors, further cause the digital content generation platform to:

receive, by the preview interface, a new classifier in a new classification input from the user, wherein the new classifier is not found within the content database;

determine, by the product generation module, a plurality of candidate structure sets and associate the plurality of candidate structure sets with the new classifier;

populate, by the preview interface, new structure previews with the plurality of candidate structure sets;

receive, by the preview interface, a new structure input by user selection of one of the new structure previews embodying one of the candidate structure sets;

render, by the product generation module, the draft product layout with the content fields of the one of the candidate structure sets defined by the new structure input;

send, by the product generation module, a content element request to the machine learning module to generate a plurality of unvalidated content elements to form the content variation pool for each of the content fields;

in response to the content element request, generate a prompt, by the machine learning module, wherein the prompt is formatted to instruct the GAI application to generate each of the unvalidated content elements, the prompt containing a classifier instruction identifying the new classifier;

select, by the product generation module, one of the unvalidated content elements to populate a new content preview for each of the content fields from within the content variation pool;

receive, by the preview interface, a new user approval of one or more of the new content previews showing the one of the unvalidated content elements;

in response to receiving the new user approval, populate, by the product generation module, the content fields of the draft product layout using the one of the unvalidated content elements associated with the corresponding approved content preview;

receive, by the preview interface, an indication to refresh the one of the unvalidated content elements by user selection of the corresponding approved content preview; and in response to receiving the indication to refresh the one of the unvalidated content elements, populate, by the product generation module, another new content preview with a different unvalidated content element from the content variation pool.

8. The digital content generation platform of claim 7, wherein the computer-executable instructions, when executed by the one or more processors, further cause the digital content generation platform to:

store, by the content data module, the unvalidated content elements within an unvalidated content store, store the new classifier as an unvalidated classifier within the unvalidated content store, and associate the unvalidated content elements with the unvalidated classifier and the structure elements of a corresponding candidate structure set;

retrieve, by the product generation module, the unvalidated content elements from the unvalidated content store when a subsequent classification input by one of the users selects the unvalidated classifier, wherein each of the unvalidated content elements has a favorability parameter; and increase, by the feedback and training module, the favorability parameter of a corresponding unvalidated content element when the corresponding content preview is approved, or decrease the favorability parameter of the corresponding unvalidated content element when the corresponding content preview is refreshed.

9. The digital content generation platform of claim 8, wherein the computer-executable instructions, when executed by the one or more processors, further cause the digital content generation platform to:

transfer, by the content data module, the corresponding unvalidated content element from the unvalidated content store to the content database when the favorability parameter of the corresponding unvalidated content element exceeds a positive threshold.

10. The digital content generation platform of claim 8, wherein the computer-executable instructions, when executed by the one or more processors, further cause the digital content generation platform to:

associate, by the product generation module, one or more of the content fields within one of the candidate structure sets defined by the structure input with a content instruction to instruct the machine learning module to generate a prompt; and combine, by the machine learning module, the content instruction and the classifier instruction to generate the prompt to instruct the GAI application to generate each of the unvalidated content elements associated with the one or more content fields.

11. The digital content generation platform of claim 8, wherein:

the classification input defines at least one of the classifiers within the content database in addition to the new classifier to form a classifier grouping; and the computer-executable instructions, when executed by the one or more processors, further cause the digital content generation platform to:

retrieve, by the machine learning module, an example instruction corresponding to a content element associated with the one or more classifiers within the content database within the classifier grouping; and generate, by the machine learning module, the prompt for one of the unvalidated content elements by combining the classifier instruction with the example instruction, causing the GAI application to pattern generated unvalidated content after the example instruction.

12. The digital content generation platform of claim 8, wherein the computer-executable instructions, when executed by the one or more processors, further cause the digital content generation platform to:

pre-generate, by the product generation module, the unvalidated content elements by sending the content element request to generate the unvalidated content elements to form the content variation pool associated with each of the candidate structure sets once the new classifier is defined and prior to the user entering the structure input.

13. The digital content generation platform of claim 2, wherein the computer-executable instructions, when executed by the one or more processors, further cause the digital content generation platform to:

batch, by the product generation module, a plurality of templates into the draft product layout, wherein the draft product layout comprises a plurality of batches, each batch has a distinct set of classifiers or sub-classifiers, and the structure elements of a digital product are contained within one of the batches, and wherein the batching provides an organizational structure to the digital product with distinct components or sections; and receive, by the interface module, a unique classification input and a unique structure input from the user for each of the batches.

14. The digital content generation platform of claim 2, wherein the computer-executable instructions, when executed by the one or more processors, further cause the digital content generation platform to:

present, by the preview interface, each structure preview or each content preview in an expanded state.

15. The digital content generation platform of claim 2, wherein the computer-executable instructions, when executed by the one or more processors, further cause the digital content generation platform to:

output, by the product generation module, the completed digital product as a downloadable file.

* * * * *